United States Patent [19]

Moake

[11] Patent Number: 5,469,736
[45] Date of Patent: Nov. 28, 1995

[54] APPARATUS AND METHOD FOR MEASURING A BOREHOLE

[75] Inventor: Gordon Moake, Houston, Tex.

[73] Assignee: Halliburton Company, Duncan, Okla.

[21] Appl. No.: 412,022

[22] Filed: Mar. 28, 1995

Related U.S. Application Data

[63] Continuation of Ser. No. 130,091, Sep. 30, 1993, abandoned.
[51] Int. Cl.⁶ .................................................. E21B 47/00
[52] U.S. Cl. ............................ 73/151; 33/302; 324/323; 166/254.2; 367/14
[58] Field of Search ................................ 73/151; 166/250; 33/302, 304; 324/323; 367/14, 25

[56] References Cited

U.S. PATENT DOCUMENTS

| | | | |
|---|---|---|---|
| 2,770,795 | 11/1956 | Peterson | 340/3 |
| 3,590,940 | 7/1971 | Leger | 73/151 |
| 3,663,842 | 5/1972 | Miller | 310/8.3 |
| 3,673,864 | 7/1972 | Cubberly, Jr. | 73/153 |
| 3,776,032 | 12/1973 | Vogel | 73/153 |
| 3,958,559 | 5/1976 | Glenn et al. | 128/2 V |
| 4,255,798 | 3/1981 | Havira | 367/35 |
| 4,273,212 | 6/1981 | Dorr et al. | 181/102 |
| 4,286,461 | 9/1981 | Bres et al. | 73/155 |
| 4,353,122 | 10/1982 | Cubberly, Jr. | 367/25 |
| 4,524,433 | 6/1985 | Broding | 367/25 |
| 4,527,425 | 7/1985 | Stockton | 73/155 |
| 4,544,859 | 10/1985 | Eoff | 310/335 |
| 4,571,693 | 2/1986 | Birchak et al. | 364/509 |
| 4,574,624 | 3/1986 | Lehtinen et al. | 73/63 |

(List continued on next page.)

FOREIGN PATENT DOCUMENTS

| | | |
|---|---|---|
| 0457650 | 11/1991 | European Pat. Off. |
| 0550254A2 | 7/1993 | European Pat. Off. |
| 2049934 | 12/1980 | United Kingdom |
| 2254921 | 10/1982 | United Kingdom |
| 2156984 | 10/1985 | United Kingdom |

OTHER PUBLICATIONS

D. Best, P. Wraight, and J. Holenka, "An Innovative Approach to Correct Density Measurements While Drilling for Hole Size Effect," *Society of Professional Well Log Analysts Thirty-First Annual Logging Symposium Transactions*, Jun. 24-27, 1990, paper G.

W. C. Paske, M. V. Rao, J. R. Twist, S. G. Mack, and R. L. Spross, "Theory and Implementation of a Borehole Caliper Measurement Made While Drilling," *Society of Petroleum Engineers Annual Technical Conference*, Sep. 23-26, 1990, paper SPE 20562.

R. A. Rosthal, D. L. Best, and B. Clark, "Borehole Caliper While Drilling from a 2-MHZ Propagation Tool," *Society of Petroleum Engineers Annual Technical Conference*, Oct. 6-9, 1991, paper SPE 22707.

J. J. Orban, M. S. Dennison, B. M. Jorion, and J. C. Mayes, entitled "New Ultrasonic Caliper for MWD Operations," *SPE/ADC Drilling Conference*, Mar. 11-14, 1991, paper SPE/ADC 21947.

(List continued on next page.)

*Primary Examiner*—Richard Chilcot
*Assistant Examiner*—George M. Dombroske
*Attorney, Agent, or Firm*—Arnold, White & Durkee

[57] ABSTRACT

An apparatus and a method are provided for measuring the caliper of a borehole, and the standoff of a drilling tool from the walls of a borehole during a drilling operation. The apparatus includes three or more sensors, such as acoustic transducers arranged circumferentially around a downhole tool or drill collar. The transducers transmit ultrasonic signals to the borehole wall through the drilling fluid surrounding the drillstring and receive reflected signals back from the wall. Travel times for these signals are used to calculate standoff data for each transducer. The standoff measurements may be used to calculate the caliper of the borehole, the eccentricity of the tool in the borehole, and the angle of eccentricity with respect to the transducer position. The eccentricity and angle computations may be used to detect unusual movements of the drillstring in the borehole, such as sticking, banging, and whirling.

43 Claims, 13 Drawing Sheets

U.S. PATENT DOCUMENTS

| | | | |
|---|---|---|---|
| 4,628,725 | 12/1986 | Gouilloud et al. | 73/861.27 |
| 4,661,933 | 4/1987 | Seeman et al. | 367/27 |
| 4,665,511 | 5/1987 | Rodney et al. | 367/35 |
| 4,692,908 | 9/1987 | Ekstrom et al. | 367/27 |
| 4,780,858 | 10/1988 | Clerke | 367/35 |
| 4,791,797 | 12/1988 | Paske et al. | 73/152 |
| 4,797,668 | 1/1989 | Zimmer | 340/857 |
| 4,805,156 | 2/1989 | Attali et al. | 367/35 |
| 4,827,457 | 5/1989 | Seeman et al. | 367/27 |
| 4,867,264 | 9/1989 | Siegfried | 181/105 |
| 4,879,463 | 11/1989 | Wraight et al. | 250/270 |
| 4,885,723 | 12/1989 | Havira et al. | 367/35 |
| 4,947,683 | 8/1990 | Minear et al. | 73/155 |
| 4,958,125 | 9/1990 | Jardine et al. | 73/151 |
| 4,958,517 | 9/1990 | Maron | 73/151 |
| 4,979,151 | 12/1990 | Ekstrom et al. | 367/35 |
| 5,050,128 | 9/1991 | Saitoh et al. | 367/7 |
| 5,091,644 | 2/1992 | Minette | 250/254 |
| 5,130,950 | 7/1992 | Orban et al. | 367/34 |
| 5,159,577 | 10/1992 | Twist | 367/25 |
| 5,175,429 | 12/1992 | Hall, Jr. et al. | 250/262 |
| 5,214,251 | 5/1993 | Orban et al. | 181/102 |

OTHER PUBLICATIONS

"Evolution of an LWD Toolstring With Applications for Petrophysical Logging and Drilling Control," by I. A. Dowell, P. L. York, and C. E. Jackson, 25th Annual OTC in Houston on May 3–6, 1993.

Article entitled "Instrumentation Requirements for Kick Detection in Deep Water"; Maus et al.; pp. 1029–1034; Aug. 1979.

Brochure entitled Gearhart Geodata Services MWD Formation Evaluation; 1988.

Article entitled "Ultrasonic Velocity and Attenuation Measurements in Water–Based Drilling Muds"; Podlo et al.; University of Texas at Austin; pp. 135–140; undated.

Article entitled "A Dynamic Computer Model of a Kicking Well"; H. V. Nickens; SPE Drilling Engineering; pp. 159–173, Jun. 1987.

Article entitled "Delta Flow: An Accurate, Reliable System for Detecting Kicks and Loss of Circulation During Drilling"; J. M. Spears et al.; SPE Drilling Engineering; pp. 359–363; Dec. 1987.

Article entitled "Theoretical and Experimental Development of the Ultrasonic Diplog System"; Strozeski et al.; SPWLA Thirtieth Logging Symposium; pp. 2–21; Jun. 11–14, 1989.

Article entitled "MWD Monitoring of Gas Kicks Ensures Safer Drilling"; Robert Desbrandes et al; Petroleum Engineer International; pp. 43–52; Jul. 1987.

Article entitled "Gas Influx Detection Using MWD Technology"; T. M. Bryant et al.; IADC/SPE 19973; pp. 515–524; Feb. 27–Mar. 2, 1990.

Paper entitled "Ultrasonic Velocity as a Probe of Emulsions and Suspensions"; McClements et al.; Advances in Colloid and Interface Science; pp. 285–316; 1987.

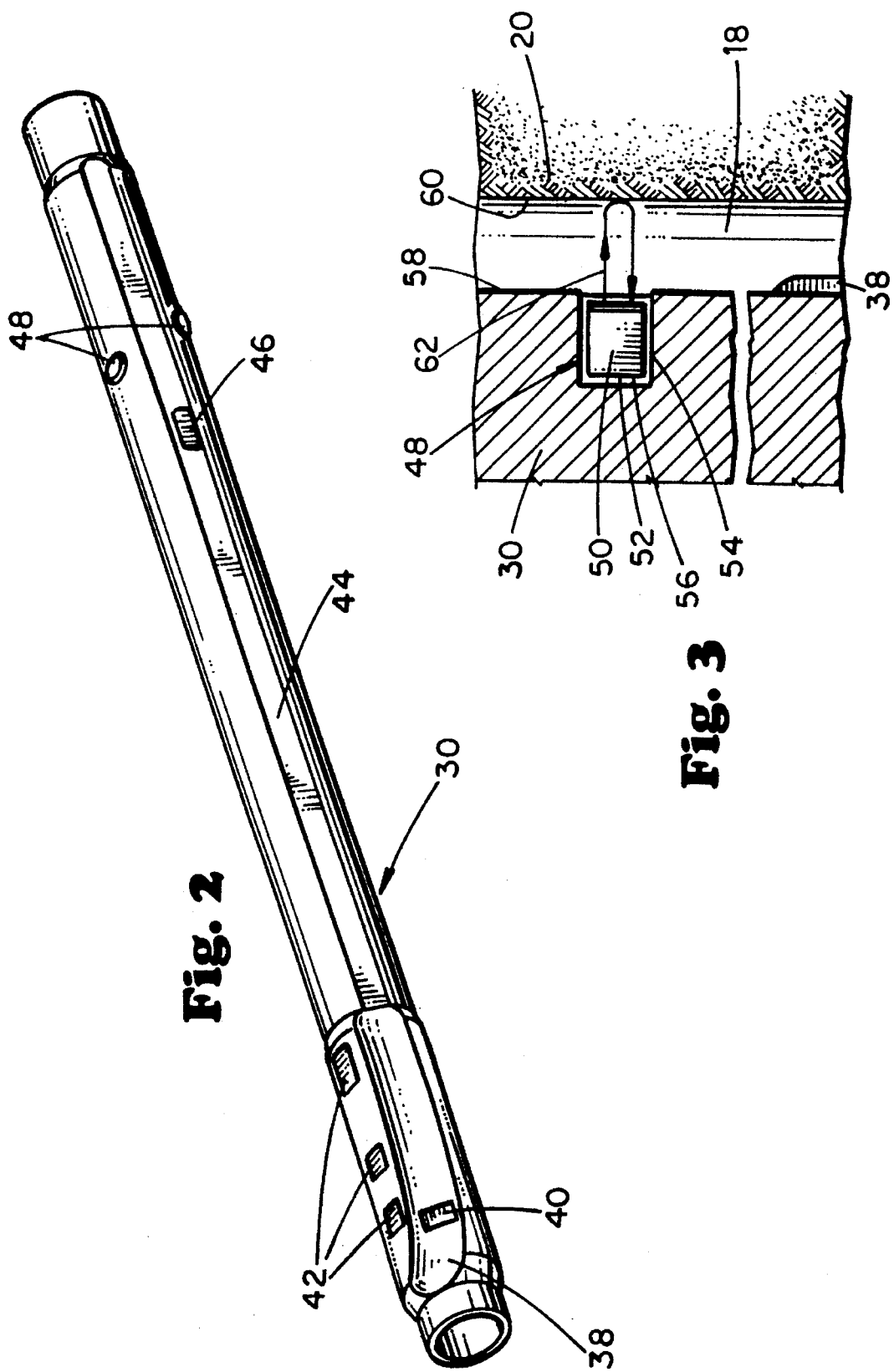

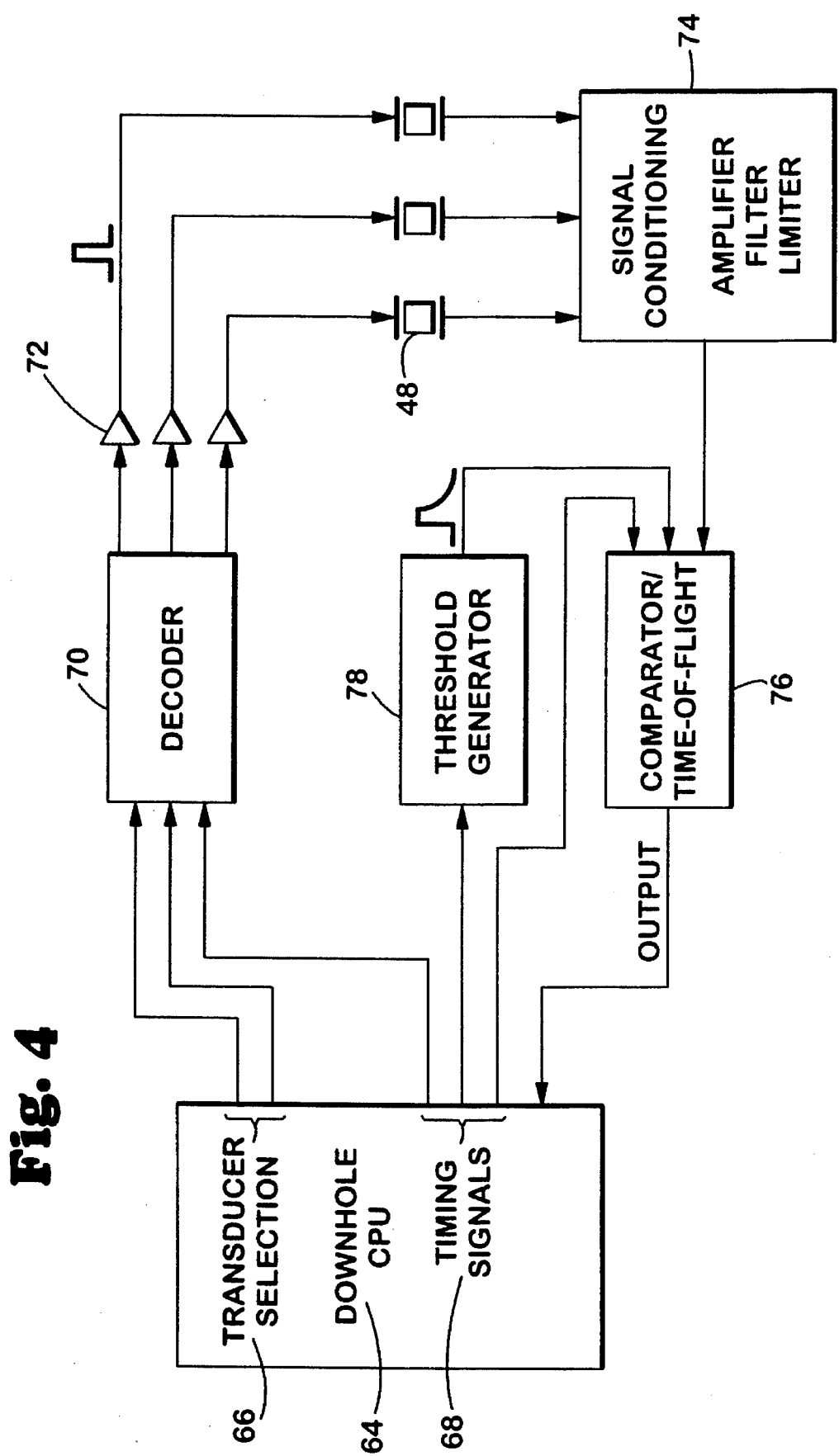

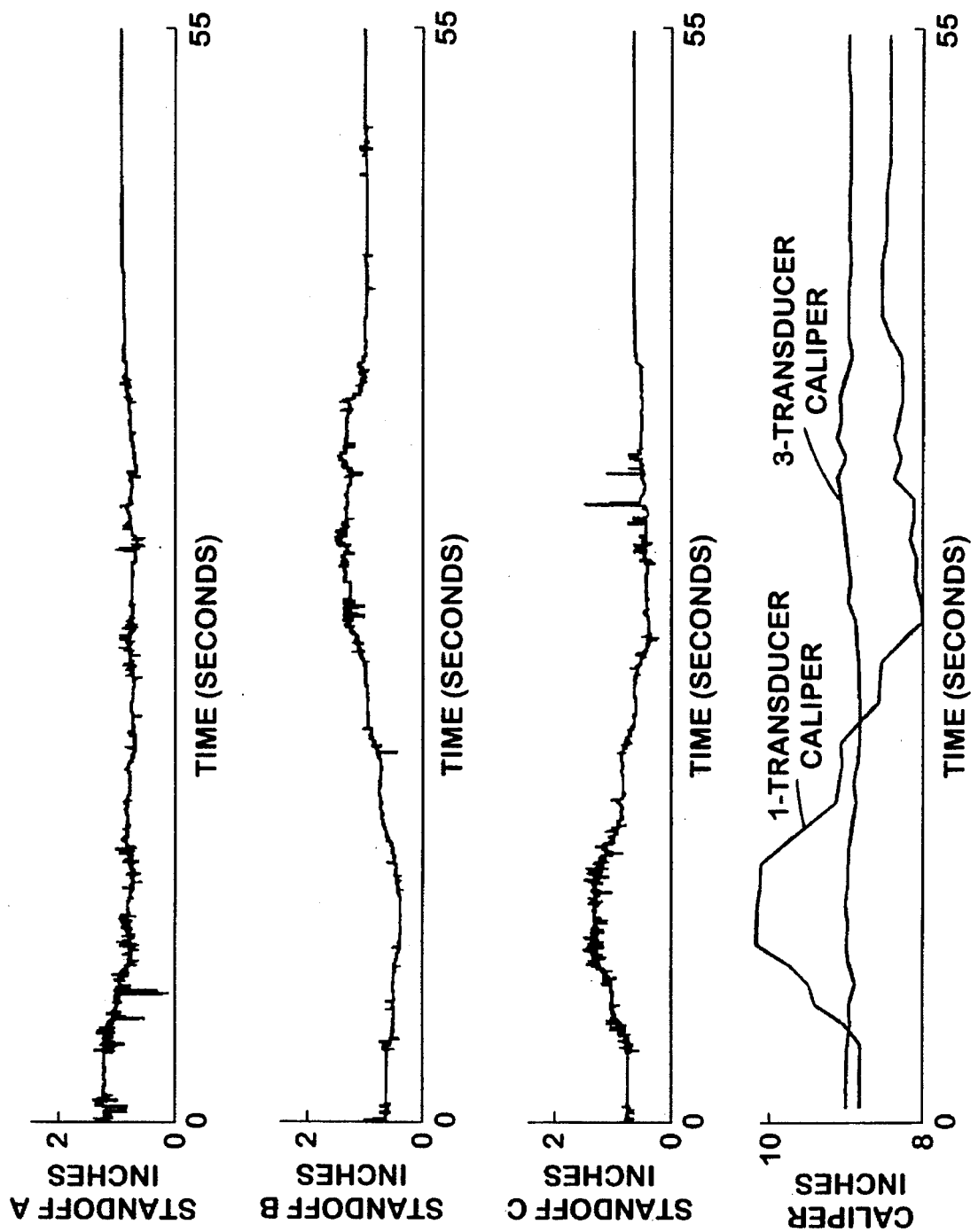

Fig. 11a-I
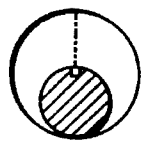
Fig. 11a-II
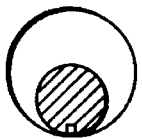
Fig. 11b-I
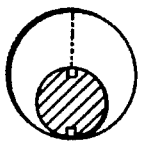
Fig. 11b-II
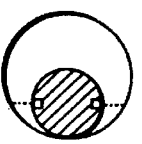
Fig. 11c-I
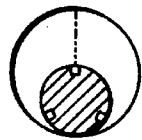
Fig. 11c-II
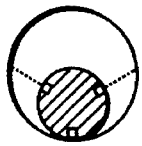
Fig. 11d
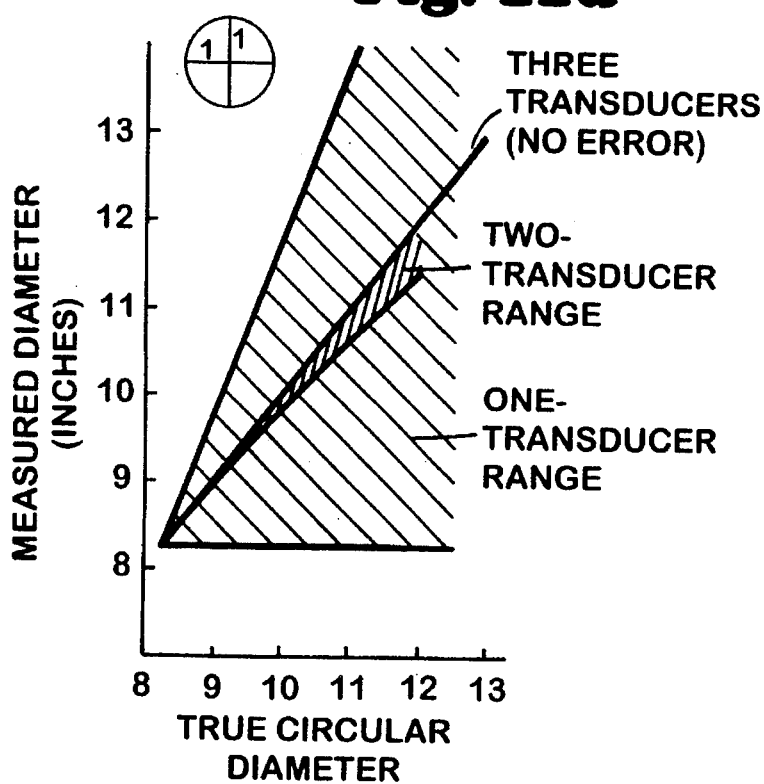
Fig. 11e
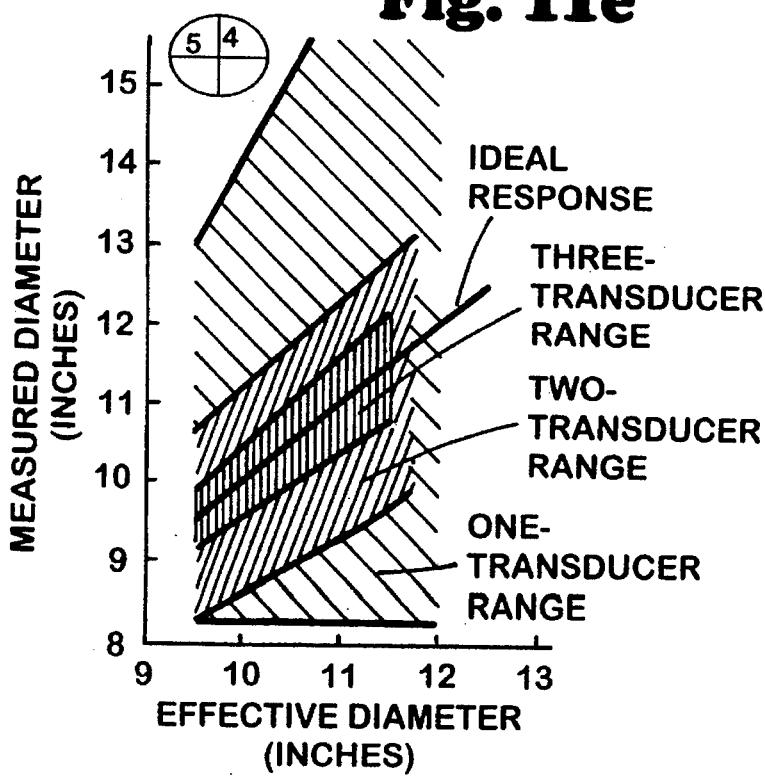

APPARATUS AND METHOD FOR MEASURING A BOREHOLE

This application is a continuation of application Ser. No. 08/130,091, filed Sep. 30, 1993 now abandoned.

BACKGROUND OF THE INVENTION

1. Field of the Invention

The present invention relates generally to an apparatus and method for measuring a borehole and, more particularly, to an apparatus and method for acoustically measuring the caliper of a borehole, and the standoff of a drilling assembly from a borehole wall during a drilling operation.

2. Description of Related Art

Modern petroleum drilling and production operations require a great deal of information relating to underground conditions. Such information typically includes characteristics of the earth formations traversed by a well, in addition to data on the size and configuration of the borehole itself. Among the characteristics of the earth formation of interest to drillers are the porosity and density of the rock or strata surrounding the borehole. However, the processes often employed to measure these characteristics are subject to important errors unless information on the borehole size and configuration is also taken into account in their determination.

The collection of information on downhole conditions, often referred to as "logging" in the art, may be accomplished in several ways. A sonde, or probing tool, often having a number of detecting and sensing devices for measuring various downhole parameters, may be lowered into the borehole on the end of a cable, or wireline. The cable serves to control the position of the sonde and conveys information collected by the detectors and sensors to the surface where the data can be evaluated. Such wireline techniques may be used for measuring the caliper of a borehole by incorporating mechanical calipers in a sonde. The calipers extend out from the sonde and contact the wall of the borehole to measure its dimensions. It is also known to incorporate acoustic devices in a wireline sonde for measuring the caliper of the borehole.

While wireline logging is useful in collecting information on underground formations, it has a number of drawbacks. In order to insert the sonde in the borehole, the drillstring must be removed, resulting in considerable cost and downtime for the driller. In addition, such techniques do not afford data collection during the drilling operation. Moreover, mechanical calipers may scratch or damage the borehole or well casing, and are not suitable for obtaining measurements during the drilling process.

In recent years increasing emphasis has been placed on the collection of data on downhole conditions during the drilling process. In addition to information on weight on bit, torque on bit, and direction of drilling, such information typically includes the size and configuration of the borehole, the position of the drilling assembly in the borehole, and the movement of the drill bit and the drillpipe in the hole. By collecting and processing such information during the drilling process, the driller can modify or correct key parameters of the operation to optimize performance. Schemes for collecting measurements of downhole conditions and movement of the drilling assembly during the drilling operation have come to be known collectively as "measurement while drilling" techniques, or "MWD.[ Similar techniques, concentrating more on measurement of formation parameters than on movement of the drilling assembly, have recently been differentiated by the name "logging while drilling" or "LWD." While distinctions between these types of data collection may exist, the terms MWD and LWD are often used interchangeably, and the term LWD, as used throughout the present description, should be understood to include both the collection of formation and borehole information, as well as data on movement of the drilling assembly.

In known MWD and LWD techniques, detecting and sensing devices are positioned on a downhole tool, or "bottom hole assembly," abbreviated "BHA," above the drill bit. The configuration of the tool may vary depending upon the data being collected, but such tools typically include devices for determining the neutron porosity of earth formations, employing a nuclear source housed in the tool. To determine the density of such formations, the tool often includes devices which emit energy, such as gamma rays, to the formation surrounding the tool, and receive and detect some part of the energy reflected by the formation. Acoustic devices have recently been included in the tools to collect information on the size, or caliper of the hole as well as on standoff.

Accurate caliper and standoff measurements collected in LWD operations are important for a number of reasons. Because the density and porosity measurements are used to calculate characteristics of the earth formation based on assumptions about the size and configuration of the borehole, the caliper and standoff measurements collected by acoustic devices are useful in correcting the density and porosity measurements where the actual borehole conditions differ from those assumed in the calculations. Thus, accurate caliper and standoff measurements are key to obtaining and interpreting reliable density and porosity data. In addition, knowing the caliper of the borehole allows the driller to estimate the amount of cement required to fill the annular volume between the casing and the formation upon completion of the well. Also, such information can permit the driller to interpret how the drill bit or drillpipe is behaving during drilling. Because unusual movements of the drillpipe, such as whirling, sticking, and lateral bouncing, can have a very detrimental effect on the drill bit and drillpipe, this information can be extremely useful to the driller in mitigating tool wear and associated operational costs.

Due to the unsuitability of mechanical calipers to LWD applications, a number of indirect methods of determining borehole diameter have been proposed. These methods generally infer borehole caliper from other measurements taken in the well. Examples of such techniques are described in the following technical papers: D. Best, P. Wraight, and J. Holenka, "An Innovative Approach to Correct Density Measurements While Drilling for Hole Size Effect," *Society of Professional Well Log Analysts Thirty-First Annual Logging Symposium Transactions*, Jun. 24–27, 1990, paper G; W. C. Paske, M. V. Rao, J. R. Twist, S. G. Mack, and R. L. Spross, "Theory and Implementation of a Borehole Caliper Measurement Made While Drilling," *Society of Petroleum Engineers Annual Technical Conference*, Sep. 23–26, 1990, paper SPE 20562; and R. A. Rosthal, D. L. Best, and B. Clark, "Borehole Caliper While Drilling from a 2-MHZ Propagation Tool," *Society of Petroleum Engineers Annual Technical Conference*, Oct. 6–9, 1991, paper SPE 22707. However, because such techniques employ indirect methods rather than direct measurement of borehole caliper, the resulting data are of limited accuracy.

Known LWD tools employing acoustic devices for collecting caliper and standoff information generally either include a single acoustic device, or two such devices positioned in diametrically or azimuthally opposed locations on the tool. In operation, the acoustic device emits an ultrasonic signal in response to a timed voltage pulse. The signal travels through the drilling fluid, or mud, surrounding the tool, is reflected from the wall of the earth formation comprising the borehole, and returns to the tool. A detector on the tool receives the reflected signal, and electronic circuitry records the time of reception. By measuring or estimating the speed at which sound propagates through the drilling fluid, referred to as the acoustic velocity of the fluid, the time required for the signal to travel to the borehole wall and back to the tool can be used to calculate the standoff of the tool from the wall. Similar calculations, performed very rapidly as the drillstring turns in the borehole, provide information on the caliper and configuration of the hole. A caliper of this type is described in a paper by J. J. Orban, M. S. Dennison, B. M. Jorion, and J. C. Mayes, entitled "New Ultrasonic Caliper for MWD Operations," *SPE/ADC Drilling Conference*, Mar. 11–14 1991, paper SPE/ADC 21947.

However, such tools do not provide accurate caliper measurements where the borehole is elliptical, or when the tool is not centered in the borehole. Such eccentricity within the borehole is very common due to movement of the drill bit and drillpipe, particularly in directional or horizontal drilling operations. Moreover, in many drilling operations, rotation of the drill bit is not carried out by rotating the drillstring from the surface, but by the use of a downhole motor, or "mud motor," which forces the drill bit to rotate by the pressurized flow of drilling fluid through the drillpipe. In such cases, the drillstring may rarely be concentric with the borehole, and single or double transducer caliper systems do not provide sufficiently accurate measurements. Finally, while measurements from single or double transducer caliper systems may be averaged to reduce error, this is only possible for measurements taken during rotation of the drillstring. Errors in measurements taken during tripping into and out of a well, during which time the drillstring is not rotating, cannot be reduced by such averaging.

The present invention is directed to overcoming or minimizing the drawbacks of the existing techniques set forth above. In particular, the invention is directed to a tool and method for accurately and reliably measuring the dimensions of a borehole during a LWD operation.

SUMMARY OF THE INVENTION

In accordance with one aspect of the invention, there is provided an apparatus for determining dimensions of a borehole penetrating an earth formation during drilling of the formation. The apparatus includes a drill bit, and a drill collar coupled to the drill bit. The apparatus further includes at least three distance-determining sensors circumferentially spaced relative to the drill collar.

In accordance with another aspect of the invention, an apparatus is provided for determining the dimensions of a borehole penetrating an earth formation during drilling of the borehole, including a drilling assembly, which in turn includes a drill collar. The apparatus further includes at least three acoustic transducers coupled to the drill collar, and arranged around the circumference of the drill collar.

In accordance with a further aspect of the invention, there is provided a method for determining a dimension of a borehole during drilling of the borehole through use of a rotating drilling assembly. The method includes providing a drilling assembly that includes at least three distance-determining sensors arranged around at least a portion of its periphery. The method further includes, during drilling of the borehole, actuating the sensors for a selected time period to determine at least three standoff measurements, and functionally relating the standoff measurements to one another to determine the dimension of the borehole.

In accordance with still another aspect of the present invention, a method is provided for determining parameters of a drilling operation wherein a rotating drilling assembly is utilized to drill an earth formation. The method includes providing a drilling assembly having at least three acoustic transducers spaced around the exterior of the assembly. The method also includes, during drilling of the borehole, the steps of actuating the sensors for a selected time period to provide at least three distance measurements, and of utilizing these distance measurements to determine a parameter of the drilling operation.

In accordance with yet another aspect of the invention, there is provided an apparatus for determining a parameter of a drilling operation wherein a rotating drilling assembly is utilized to drill an earth borehole. The apparatus includes a surface control unit situated at the earth's surface, at least three acoustic transceivers circumferentially arranged around the drilling assembly, and a communication assembly establishing data communication from the acoustic transceivers and the surface control unit.

BRIEF DESCRIPTION OF THE DRAWINGS

The present invention will become more fully understood from the following detailed description, taken in conjunction with the accompanying drawings, wherein like reference numerals refer to like parts, in which:

FIG. 2 is a perspective view of a LWD tool incorporating acoustic transducers in accordance with the invention;

FIG. 3 is a sectional view through an acoustic transducer depicting the path of a signal emanating from the transducer;

FIG. 4 is a block diagram for electronic circuitry associated with the acoustic transducers;

FIG. 10 is a logging trace of standoff measurements and illustrating caliper measurements made by the apparatus of the invention as compared with measurements using a single transducer;

FIG. 11 is a graphical representation of the output ranges of single and double transducer LWD tools compared with the output of a three transducer device in accordance with the invention;

Figure 1:
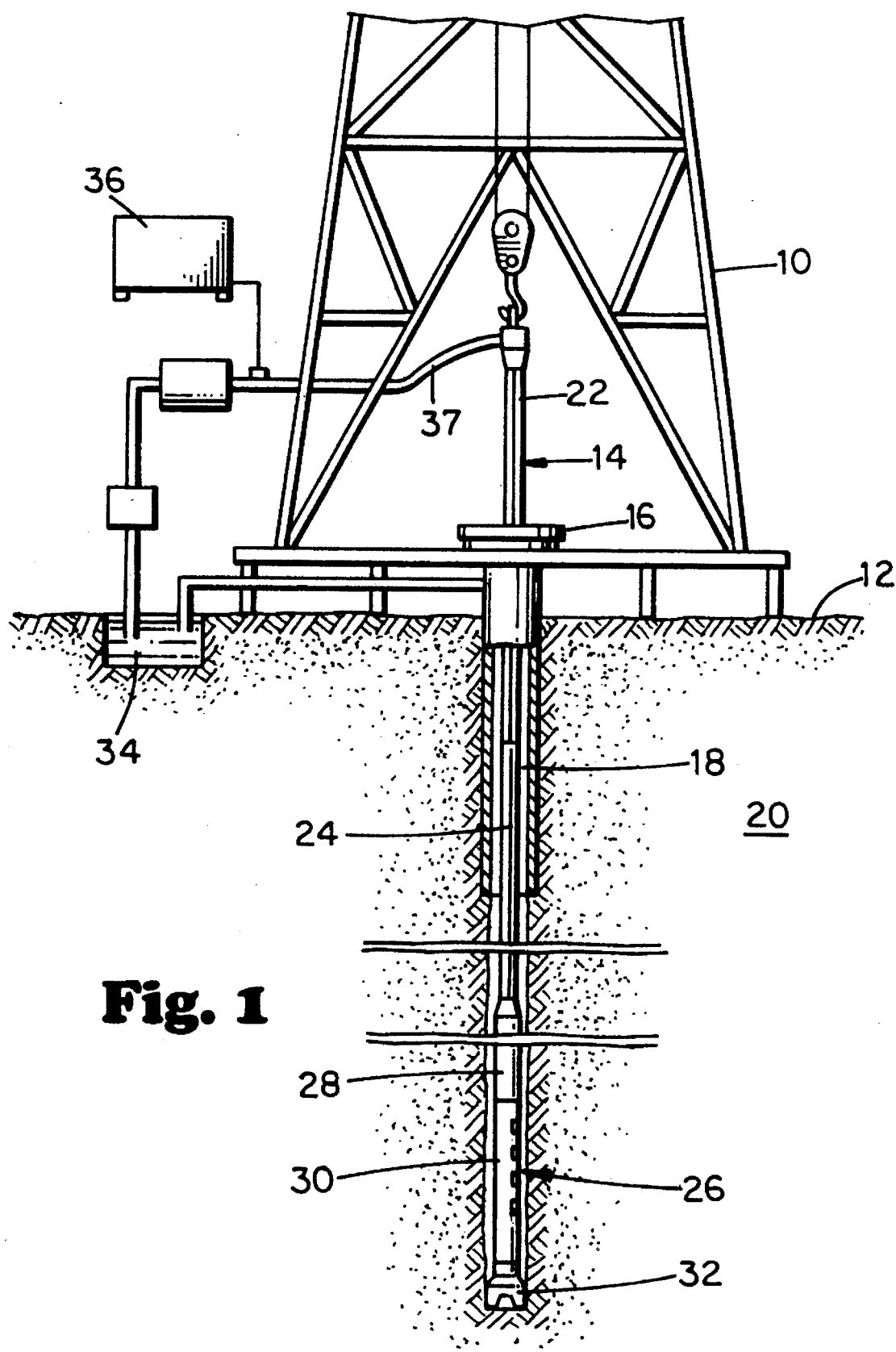
FIG. 1 is a schematic elevation of a drilling installation employing a LWD system in accordance with the invention to determine borehole and drilling parameters.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

Turning now to the drawings and referring to FIG. 1, a typical drilling installation is illustrated which includes a drilling FIG. 10, constructed on the earth's surface 12 and supporting a drillstring 14. The drillstring 14 penetrates through a rotary table 16 and into a borehole 18 being drilled through earth formations 20. The drillstring 14 includes a kelly 22 at its upper end, drillpipe 24 coupled to the kelly 22, and a bottom hole assembly, or BHA, 26 coupled to the lower end of the drillpipe 24. The BHA 26 in turn includes drill collars 28, a LWD tool 30, and a drill bit 32 for penetrating through earth formations to create the borehole 18. In operation, the kelly 22, the drillpipe 24 and the BHA 26 are driven in rotation by the rotary table 16. The drill collars 28 add weight to the drill bit 32 and stiffen the BHA 26 to allow the drill bit to crush and remove cuttings from underground formations. During this operation, drilling fluid, or mud, is pumped from a mud pit 34 through a kelly hose 36, and into the drillpipe 24 to the drill bit 32. After flowing through the drill bit 32, the drilling fluid rises through the annular area between the drillpipe 24 and the borehole 18 to be collected and returned to the mud pit 34. The drilling fluid serves a number of functions, including cooling the drill bit and removing cuttings. As an alternative to driving the drillstring from the surface, a downhole motor, or "mud motor" as it is commonly called in the art, may be employed.

The LWD tool 30 is preferably placed as near the drill bit 32 as practical. It should be understood that the tool 30 may be considered to form part of the drill collar 28. Thus, where reference is made to the tool 30 throughout the following description, such reference is intended also to include the drill collar 28 in general. Signals representing measurements of borehole dimensions and drilling parameters are generated and stored in the LWD tool 30, as will be described in greater detail below. Such signals are routed through a communication assembly (not shown) in the drillstring 14 to a control unit 37 on the earth's surface 12 where they are processed and analyzed. The communication of signals from the LWD tool 30 to the control unit 37 is accomplished in substantially the same manner as in known LWD systems.

The LWD tool 30, as depicted in FIG. 2, forms part of the drillstring 14 during operation, and may advantageously include a number of detecting and sensing devices. As shown in FIG. 2, the LWD tool 30 advantageously includes a sleeve 38 housing a density detector. The density detector is of generally known construction, such as a gamma ray density detector, and includes a source 40 and windows 42 for emitting and receiving energy for density measurements. The body of the tool 30 comprises a mandrel 44, in which preferably is housed a neutron source 46 for obtaining porosity measurements. As depicted in FIG. 2, the tool 30 also houses at least three distance determining sensors 48 spaced circumferentially around the tool 30 (only two such sensors are visible in FIG. 2). These sensors 48 are preferably acoustic transducers as will be described in detail below, and are advantageously spaced at equal invervals around the tool 30, although other spacing may be used. Thus, where the tool 30 includes three sensors 48, these are preferably placed at 120° intervals with respect to the periphery of the tool 30, or drill collar 28 which, with the tool 30 and drill bit 32, form the BHA 26. One sensor 48 is preferably aligned with the density detecting windows 42 and with the neutron detectors (not shown in FIG. 2) to provide standoff data for correction of density and porosity calculations. Although three distance determining sensors 48 are preferred, it should be understood that the number of sensors 48 may be greater than three. However, it has been found that three is the minimum number of sensors 48 needed to provide reliable measurements where the drillstring 14 is not in rotation, for example, during tripping in and tripping out of a well.

As illustrated in FIG. 3, each sensor or transducer 48 is preferably at least partially housed in the tool 30 or drill collar 28. Each transducer 48 includes a piezoelectric crystal 50, and a backing 52, and is encapsulated in epoxy 56. The transducer 48 is mounted within a recess 54 formed in the tool 30. When positioned in a borehole 18, as depicted in FIG. 3, the transducer 48 is substantially flush with the tool periphery 58 and faces the borehole wall 60. The space between the tool periphery 58 and the borehole wall 60 represents the tool standoff at the depth and angular position where the transducer 48 is located. This space between the tool 30 and the borehole wall 60 will be filled with a pressurized flow of drilling fluid during drilling. The minimum standoff will generally correspond to the thickness of the sleeve 38.

In operation, the piezoelectric crystal 50 generates ultrasonic signals 62 in response to an electrical pulse from a voltage source (not shown). This signal 62 travels through the drilling fluid surrounding the tool 30 and is reflected by the borehole wall 60. At least a portion of the ultrasonic signal 62 rebounds from the borehole wall 60 and is received by the piezoelectric crystal 50, which in turn converts the signal received into an electrical pulse. The arrival time of the signal thus received is recorded and a "time-of-flight" signal is generated by electronic circuitry as will be described below. This time-of-flight signal may then be used to calculate the distance between the transducer 48 and the borehole wall 60.

The acoustic impedance of the epoxy layer 56 is chosen to optimize the transfer of acoustic energy into the mud. Also, the impedance of the backing 52 is matched to that of the piezoelectric crystal 50, and the backing 52 serves to absorb that part of the wave emitted from the back of the crystal 50. The backing 52 quickly damps the ringing that persists in the crystal 50 after transmission. Such damping should occur before reflected waves can be identified.

A block diagram for electronic circuitry associated with the transducers 48 is shown in FIG. 4. A central processing unit, or CPU, 64 is preferably included in the tool 30. This downhole CPU 64 is programmed to trigger a voltage signal to each of the transducers 48 every 10 milliseconds, such that the transducers 48 emit ultrasonic signals sequentially in 2.5 millisecond intervals. The downhole CPU 64 first selects the transducer 48 to be triggered and generates selection signals 66. The downhole CPU 64 also generates timing signals 68 to control the triggering and signal reception processes. The transducer selection signals 66 and a first timing signal 101 are sent to a decoder 70 which initiates a voltage pulse. This voltage pulse is in turn amplified in amplifiers 72 to trigger the transducers 48. Acoustic signals reflected by the borehole wall 60 are received by the transducers 48, and amplified and filtered in a signal conditioner 74. These filtered signals are then routed to a comparator 76.

A second timing signal 102 is sent by the downhole CPU 64 to a threshold generator 78. The threshold generator 78 controls the length of the wait period between the triggering of the transducers 48 and the time at which a reflected signal will be accepted and recognized as such. This wait period is preferred to prevent false signals from the ringdown of the transducer that follows the transmission pulse. After the wait period, conditioned reflected signals are registered if they have an amplitude greater than the electronic threshold. Because the amplitude of the ultrasonic waves decreases with the distance travelled, and hence with the time-of-flight, the threshold is preferably designed to decay exponentially with time. This exponential reduction in the threshold amplitude provides a generally constant sensitivity to reflected signals regardless of the distance the acoustic waves have travelled before rebounding to the transducers 48.

The registered signals are compared with a third timing signal 103 sent by the downhole CPU 64 to the comparator 76. The comparator 76 then calculates a time-of-flight signal based on this comparison, and routes this signal to the downhole CPU 64. These time-of-light signals are further processed either by the downhole CPU 64, or by the control unit 37 on the earth's surface to obtain standoff and caliper measurements as will be described below.

Figure 5:
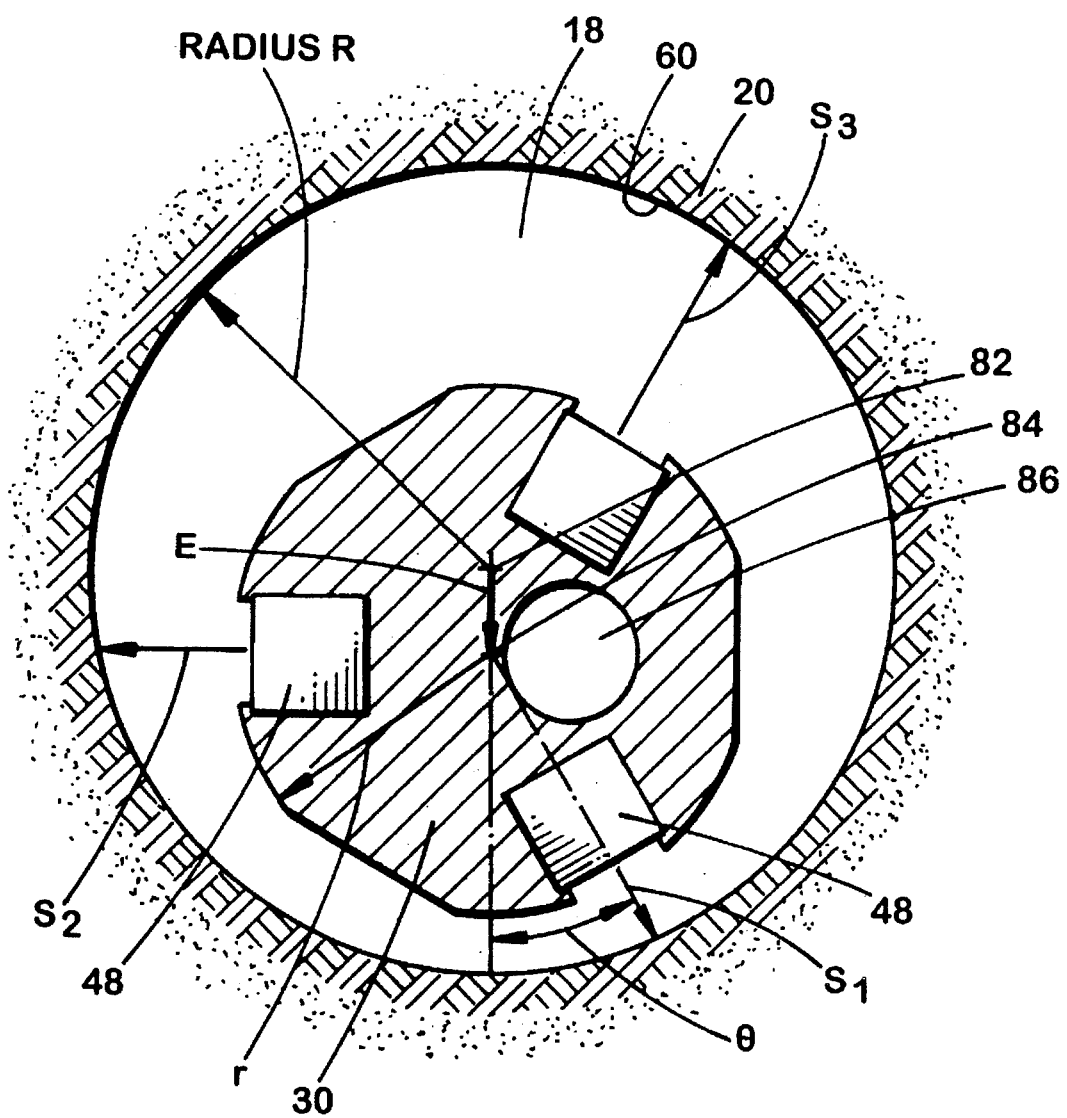
FIG. 5 is a sectional view through a LWD tool in accordance with the invention, illustrating a preferred placement of the acoustic transducers in the tool, and showing an eccentric orientation of the tool in a borehole.
Figure 6A:
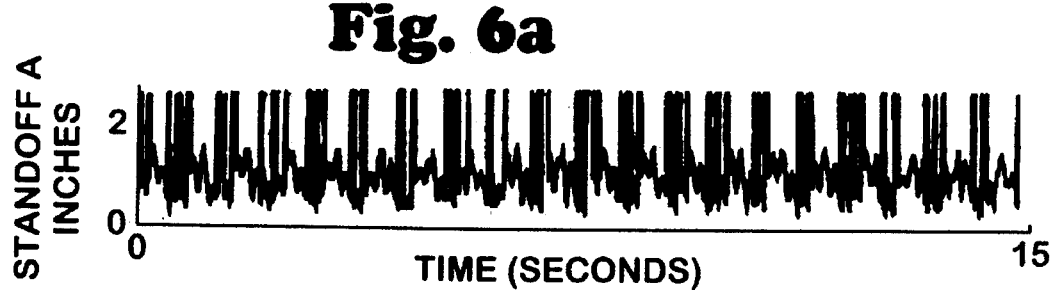
FIG. 6 is a logging trace representing raw signal output from acoustic transducers during a drilling operation.
Figure 6B:
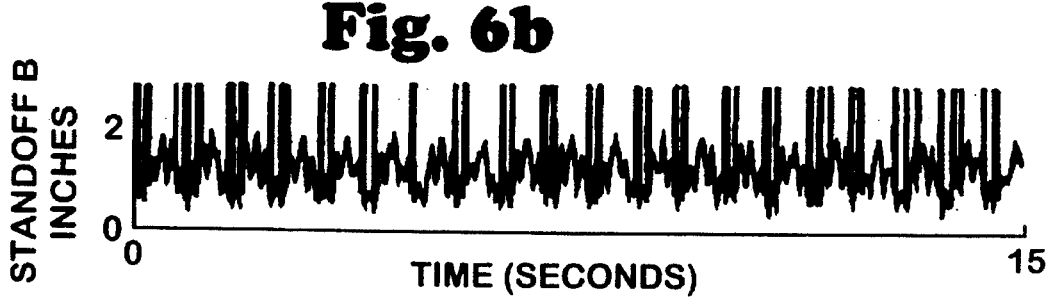
Figure 6C:
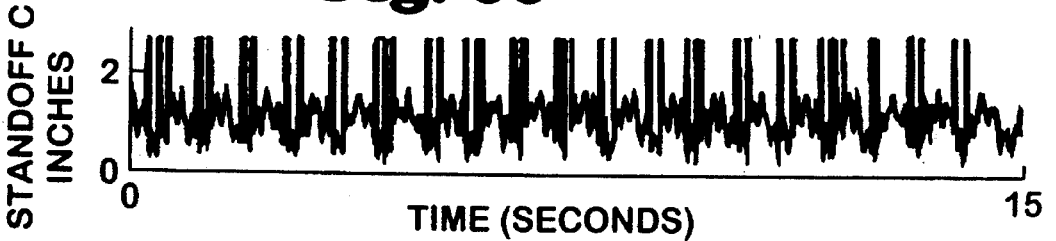
Figure 6D:
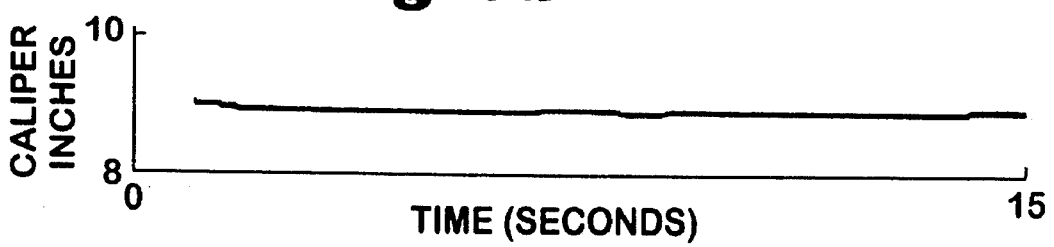
Figure 7A:
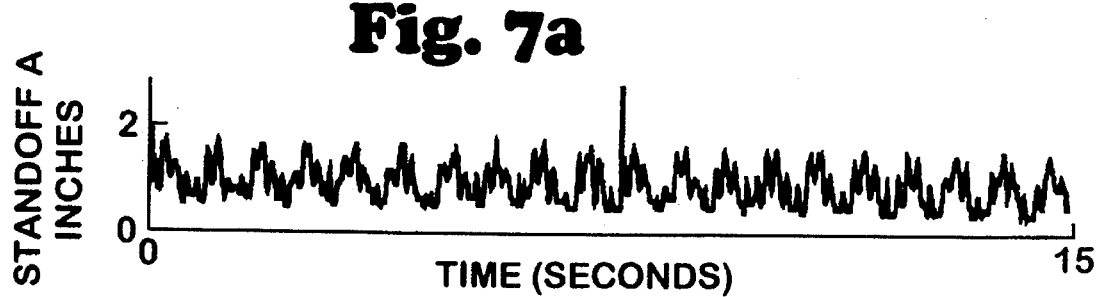
FIG. 7 is a logging trace of the signals in FIG. 6, after spike filtering.
Figure 7B:
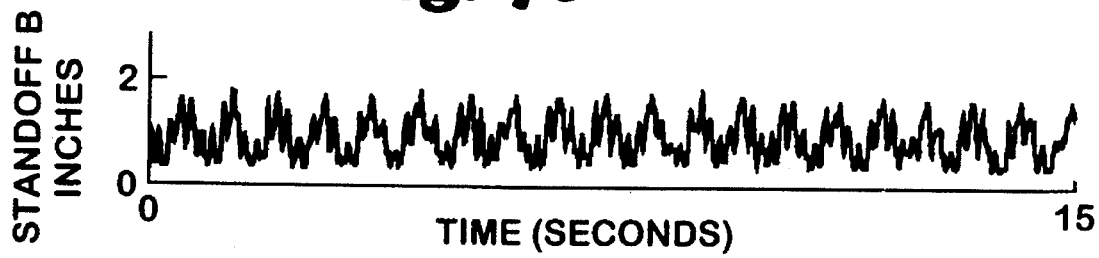
Figure 7C:
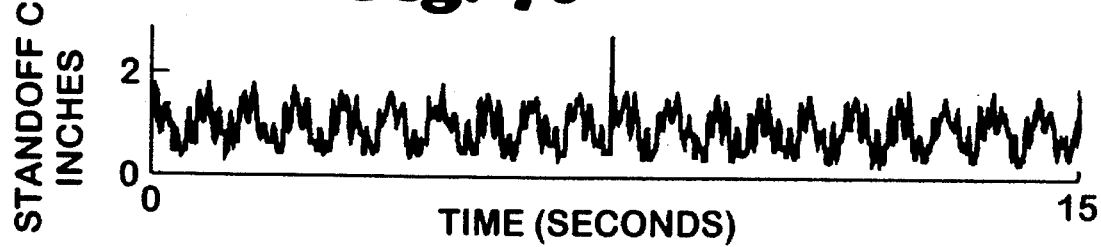
Figure 7D:
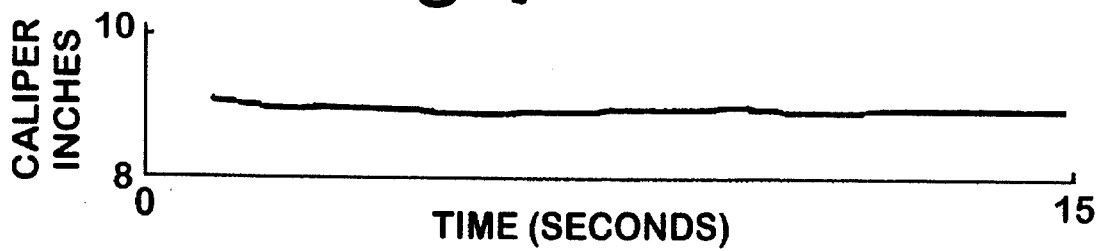
Figure 8A:
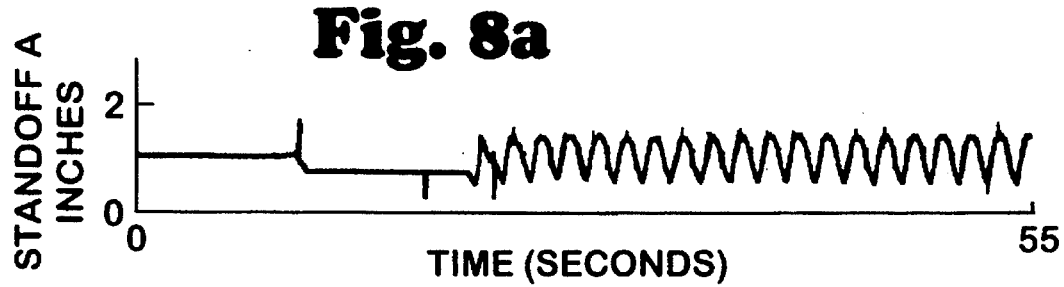
FIG. 8 is a logging trace of filtered transducer signals illustrating a transition between a stationary drillstring situation and a reaming operation.
Figure 8B:
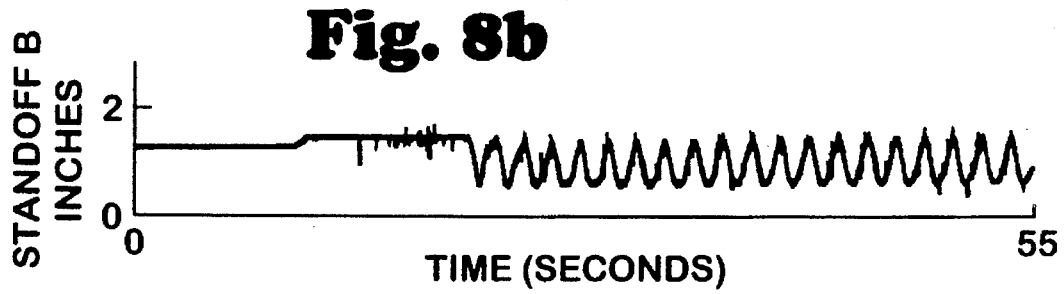
Figure 8C:
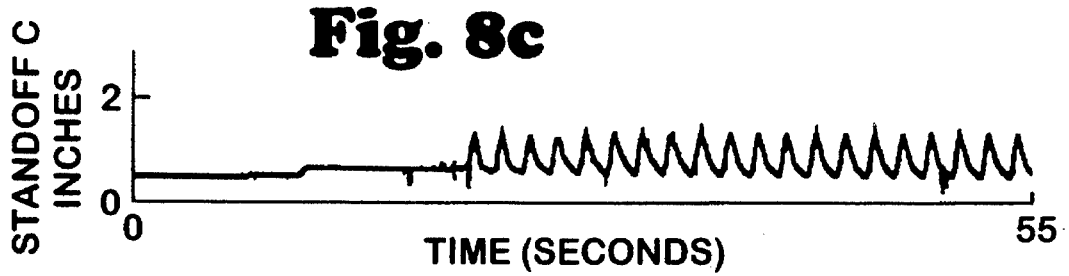
Figure 8D:
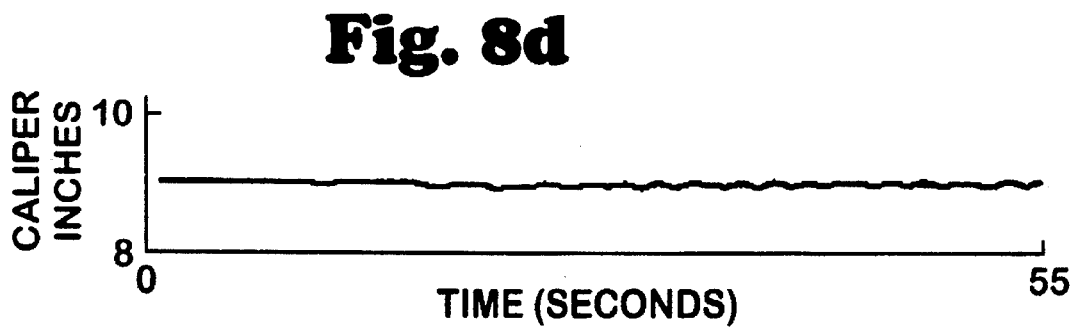
Figure 9A:
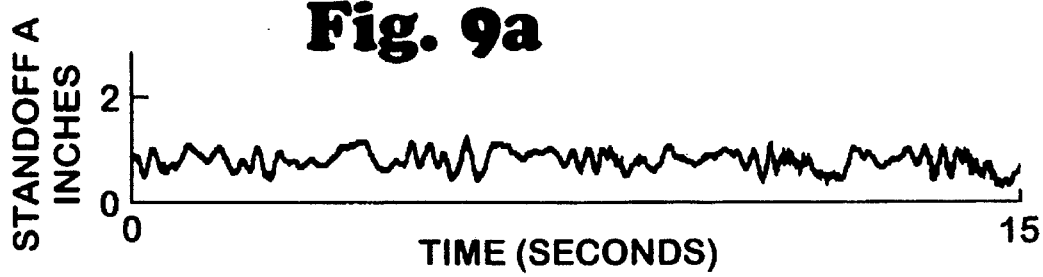
FIG. 9 is a logging trace of standoff and caliper data collected with the apparatus of the invention during drilling.
Figure 9B:
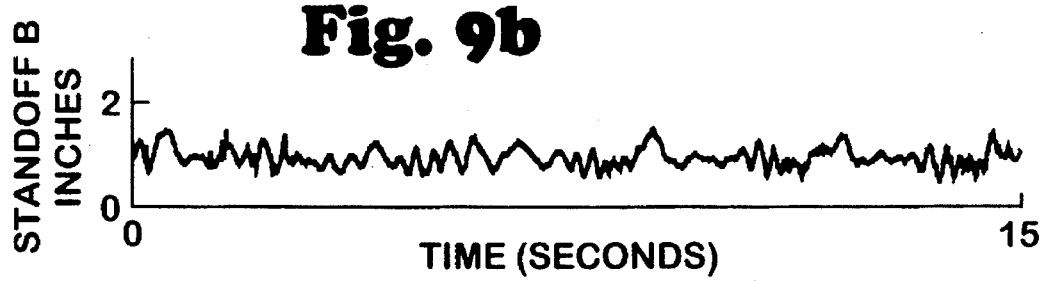
Figure 9C:
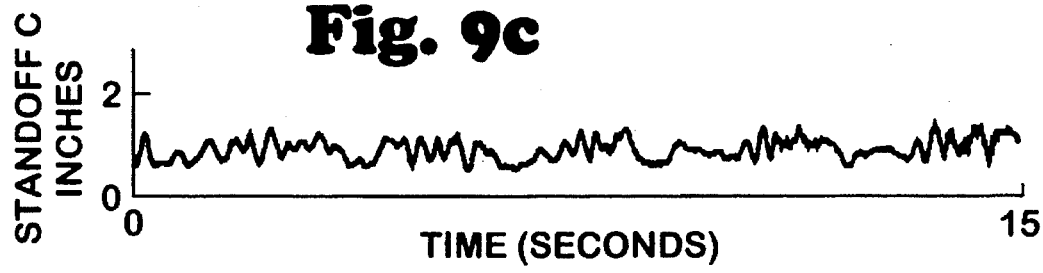
Figure 9D:
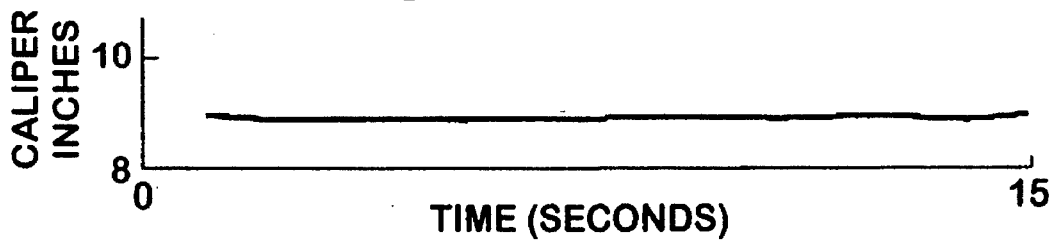
Figure 12A:
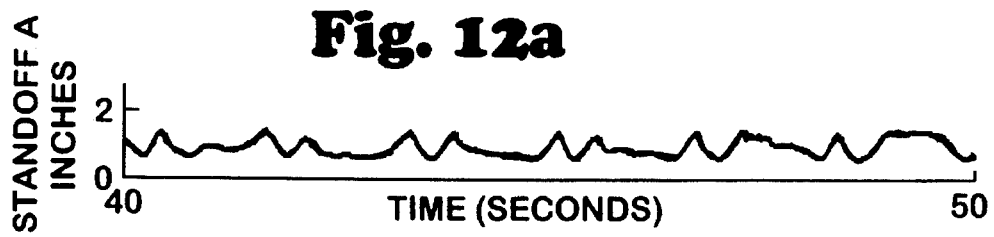
FIG. 12 is a logging trace showing standoff, eccentricity, and rotation angle information attainable with the invention, and indicating how the present invention can be used to indicate sticking of the drillstring.
Figure 12B:
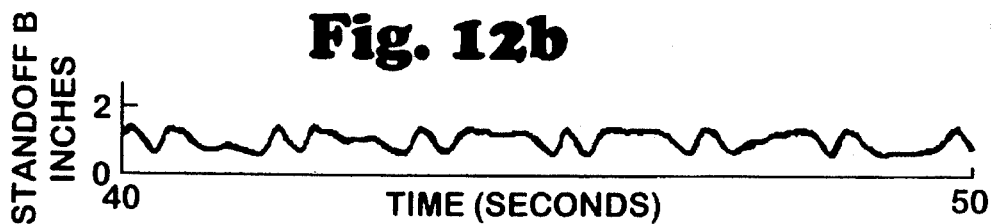
Figure 12C:
Figure 12D:
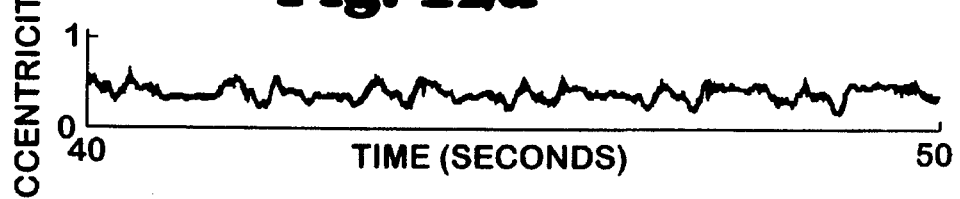
Figure 12E:
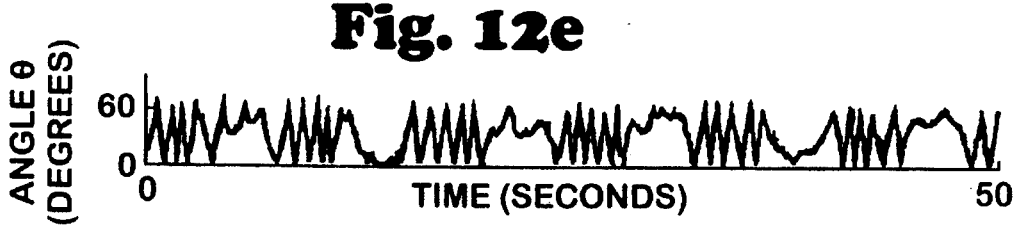
Figure 12F:
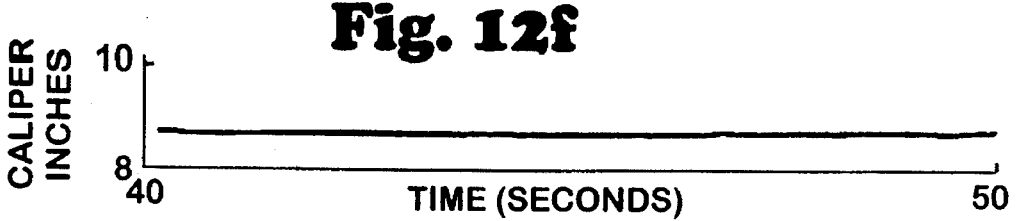
Figure 13A:
FIG. 13 is a logging trace illustrating how the invention can be used to indicate lateral bouncing of the drillstring.
Figure 13B:
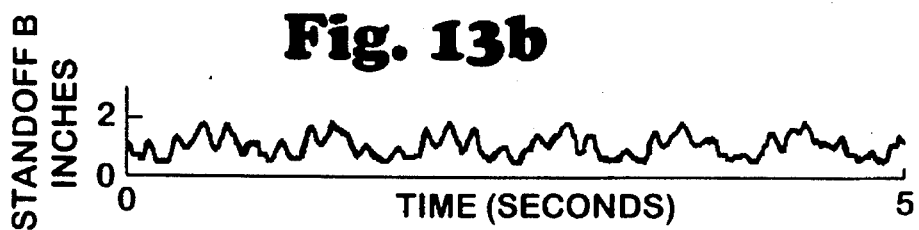
Figure 13C:
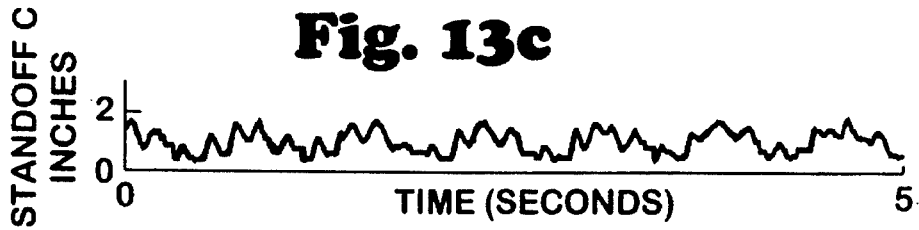
Figure 13D:
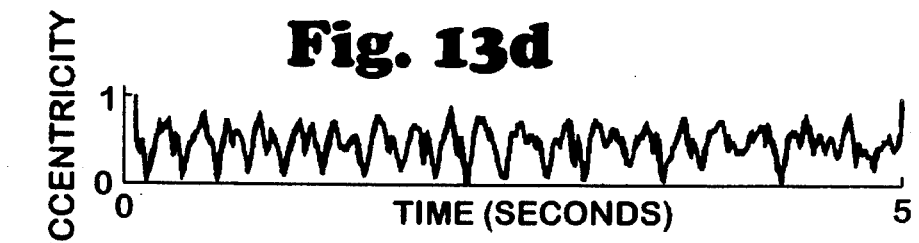
Figure 13E:
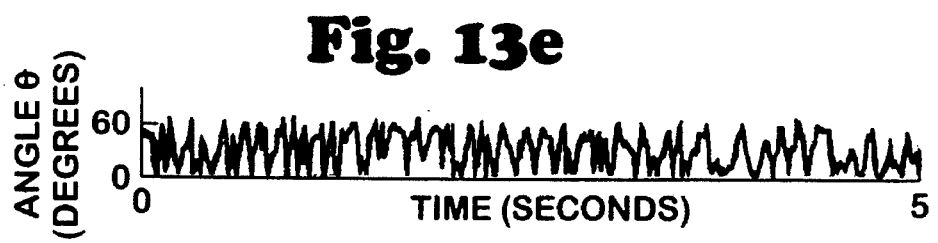
Figure 13F:
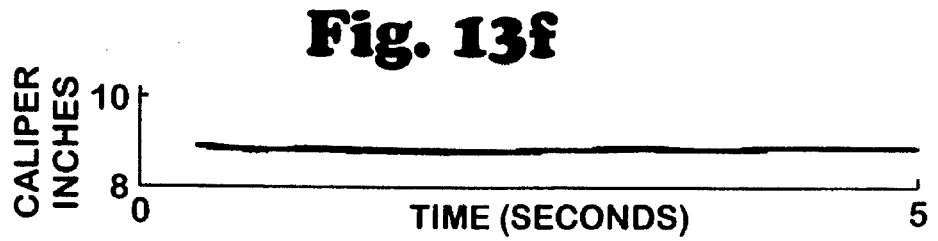
Figure 14A:
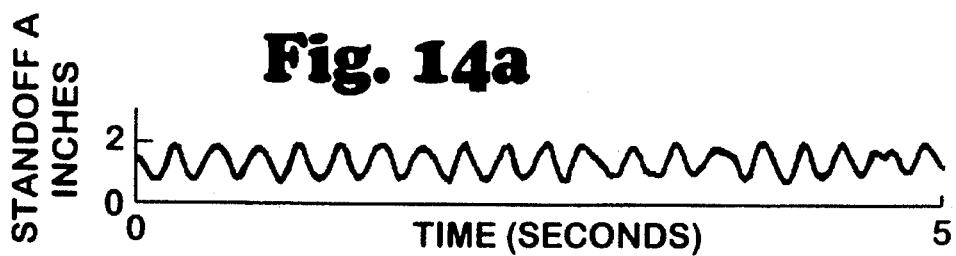
FIG. 14 is a logging trace illustrating how the invention can be used to indicate backward whirling of the drill bit in the borehole.
Figure 14B:
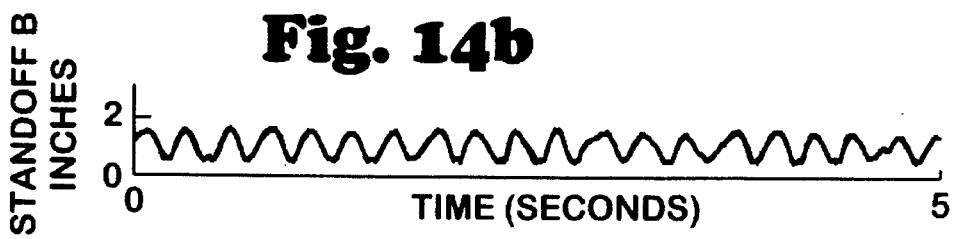
Figure 14C:
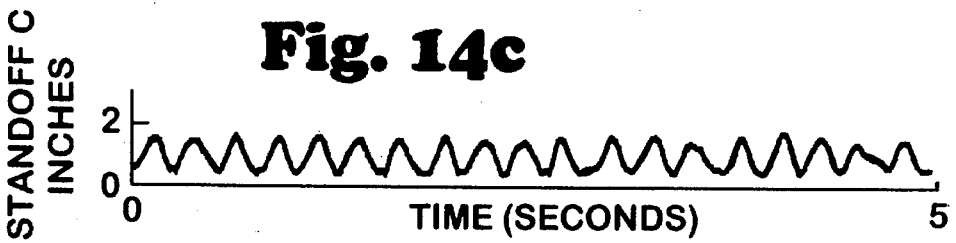
Figure 14D:
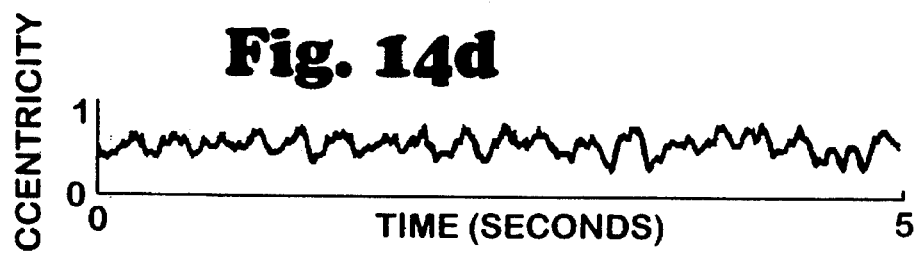
Figure 14E:
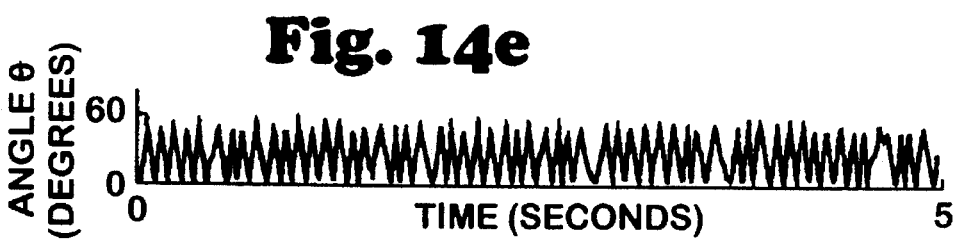
Figure 14F:
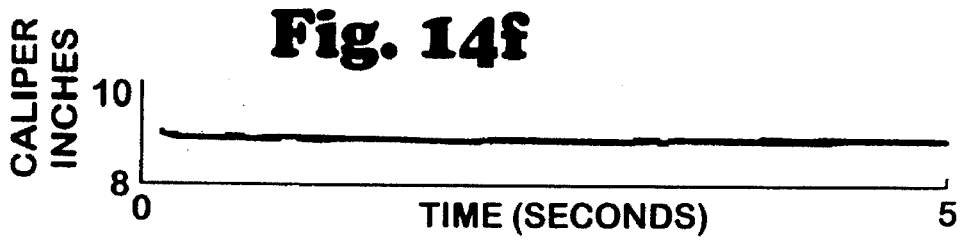

Turning more specifically now to the standoff and caliper computations, FIG. 5 depicts a cross-section of a tool 30 in a borehole 18 and illustrates the parameters considered in these computations. As shown in FIG. 5, the tool 30 includes three acoustic transducers 48. The tool 30 is traversed by a cavity 86 to accomodate a flow of pressurized drilling fluid. The tool 30 has a maximum peripheral radius r, while the borehole 18 has a radius R. As shown in FIG. 5, the tool 30 is eccentric with respect to the borehole 18, with the central axis of the borehole being designated by the reference numeral 82, and the central axis of the tool 30 represented by the numeral 84. The eccentricity of the tool 30 with respect to the borehole 18 is represented in FIG. 5 by the vector E.

By comparing the time-of-flight signals calculated for each of the transducers 48 for each pulsing interval, the comparator 76 and downhole CPU 64 determine which of the transducers 48 had the shortest time-of-flight for a given pulsing interval. The transducer with the shortest time-of-flight is considered to be nearest the borehole wall 60 and is assigned the standoff value $S_1$ for the purposes of the following computation, while the remaining transducers are assigned the values $S_2$ and $S_3$. The angle between the vector E and a vector passing through the center 84 of the tool 30 and the transducer 48 having the smallest standoff $S_1$ is designated θ for computational purposes, as indicated in FIG. 5.

The standoff S of any given transducer 48, may then be calculated in the downhole CPU 64, or in the control unit 36 by the formula:

$$S = v(t-t_0)/2 - d \qquad \text{(Equation 1)},$$

where S is the standoff of the transducer 48 from the borehole wall 60, v is the speed of sound, or acoustic velocity in the drilling fluid surrounding the tool 30, t is the time of flight of the acoustic pulse, and d is the distance that the transducer is recessed in the tool 30. The offset time $t_0$ embodies the electronic delays and the transit time of the acoustic wave through the encapsulating epoxy. These delays and transit time are determined in a tool calibration procedure prior to entry of the tool 30 in service.

Although the acoustic velocity v of the drilling fluid under actual downhole conditions may be measured dynamically by various known techniques, it has been found that assigning a value to v based on the known borehole conditions provides sufficient accuracy. Relevant parameters are the type of drilling fluid (water-based or oil-based), the fluid weight, the fluid salinity, temperature, and pressure. Those skilled in the art will recognize that from these parameters, generally known during a drilling operation, the acoustic velocity v can be estimated.

Once the standoff distances $S_1$, $S_2$, and $S_3$ have been calculated for each transducer 48 as described above, the caliper of the borehole 18 may be calculated by first calculating the borehole radius R as follows. Radii from the tool center 84 to the borehole wall 60 are first calculated by the formulas:

$$r_1 = S_1 + r \qquad \text{(Equation 2)},$$

$$r_2 = S_2 + r \qquad \text{(Equation 3)},$$

$$r_3 = S_3 + r \qquad \text{(Equation 4)},$$

where $r_1$, $r_2$, and $r_3$ are the distances to the borehole wall 60, and r is the radius of the tool 30. From these values, an intermediate variable α may be calculated, and this variable used to calculate the radius R of the borehole as follows:

$$\alpha = \frac{(r_1 + r_2 + r_3) r_1 r_2 r_3}{r_1 r_2 + r_2 r_3 + r_1 r_3}, \qquad \text{(Equation 5)}$$

$$R^2 = \alpha + \frac{(\alpha - r_1^2)^2}{4 r_1^2} + \frac{1}{12} \left( \frac{\alpha - r_3^2}{r_3} - \frac{\alpha - r_2^2}{r_2} \right)^2. \qquad \text{(Equation 6)}$$

The radius R calculated in the foregoing manner represents the effective radius of the borehole 18. Where the borehole 18 is circular in cross-section, the calculated radius R will be very close to the actual radius. At depths where the borehole 18 is not circular in cross-section, the calculated radius R will be the radius of a circle having the same area as the actual cross-sectional area of the borehole 18. Thus the effective caliper of the borehole 18 may be computed by doubling the effective radius R calculated as described.

The method described above also permits computation of the eccentricity E of the tool 30 with respect to the borehole 18, and of the angle of eccentricity θ. These values can be extremely useful in evaluating certain types of abnormal motion of the drillstring 14 as will be described below. From the values calculated above, the eccentricity E may be computed by the following equation:

$$E^2 = R^2 - a \qquad \text{(Equation 7)}.$$

The angle θ is computed from the following equation:

$$\cos\Theta = \frac{R^2 - E^2 - r_1^2}{2r_1 E}.$$ (Equation 8)

To provide examples of the foregoing signal processing and data computation procedures, measurements of a borehole 18 were taken using a LWD tool 30 substantially similar to that depicted in FIG. 2. The examples include measurements made during drilling, throughout a transition from a stationary condition to rotary operation, and during tripping out of a well. Traces of signals collected and computations made in the examples are represented in FIGS. 6 through 10.

FIG. 6 shows raw transducer standoff signals received while drilling over a 15 second interval. The spikes evident in the raw signals result from emitted acoustic signals for which no return signal was detected, known as "time-outs," or from the failure to detect a return signal due to misangling. Time-outs may occur, for example, where the acoustic signal rebounds from an obstruction in the drilling fluid between the tool 30 and the borehole wall 60, causing the return signal to arrive earlier than the comparator 76 permits. Time-outs may also occur where the amplitude of the return signal is too low to be recognized by the comparator as a valid measurement. One cause of such time-outs is an insufficient acoustic impedance difference between the drilling fluid and the formation 20, in which case very little of the acoustic signal rebounds to the transducer 48. Misangling spikes may occur in cases of severe eccentricity, where acoustic signals rebound from the borehole wall 60 at an angle such that the return signal misses the transducer 48.

To eliminate errors due to such spikes, the CPU 64 filters the signals to remove timeouts and other spurious signals. This ensures that the standoff used in the nuclear measurements is of high quality. The resultant standoff is then averaged over a specified time interval, such as from 1 to 60 seconds, and stored. Where a measurement is made by each of three transducers 48 every 10 milliseconds, such averaging has been found satisfactorily to define the borehole 18 for standoff and caliper measurements. FIG. 7 shows the same set of signals as in FIG. 6, but after signal conditioning to remove spikes and spurious signals. Standoff measurements have been converted to inches and the caliper measurement, computed as indicated above, is displayed below the standoff measurements.

FIG. 8 shows a similar trace, but illustrates the accuracy of the three transducer arrangement described above both while the drillstring 14 is stationary, and during operation. The trace reproduced in FIG. 8 indicates that the drillstring 14 was not rotating for approximately the first 15 to 20 seconds of the test, then began rotating in a reaming operation. It can be noted from this trace that lateral movements of the drillstring, evidenced by the peaks prior to the start of the reaming operation, and rotation during the operation itself alter the caliper measurement very little. Similarly, FIG. 9 indicates that caliper measurements remain steady dispite even more irratic movement of the drillstring 14 during drilling. The data presented in FIG. 9 were obtained during drilling at approximately 150 feet per hour.

FIG. 10 is a trace of measurements made while tripping out of a well over a period of approximately 55 seconds. As indicated in FIG. 10, the standoff measurements remain within a range of from 0 to 2 inches, and the caliper measurement remains generally steady. To provide a comparison of the accuracy of the present apparatus to that of a single transducer device, caliper measurements were calculated using standoff measurements from a single transducer of the three transducers in the tool 30, and those measurements were superimposed in FIG. 10 over caliper measurements calculated from standoff measurements made by all three transducers.

FIG. 11 further illustrates the improved accuracy of the caliper measurements attainable with the three transducer arrangement described above. To illustrate error ranges for caliper measurements in a worst case senario, the transducer positions shown in the FIGS. 11 (a), 11 (b), and 11 (c) were considered for single, double, and three transducer arrangements respectively, with the drill collar at its greatest possible eccentricity within the borehole. FIG. 11 (d) illustrates the range of caliper measurements obtained from each arrangement in a circular borehole, while FIG. 11 (e) illustrates similar ranges as compared to the effective diameter of an elliptical borehole with a ratio of the major axis length to minor axis length of 5:4. As evidenced in FIGS. 11 (d) and 11 (e), in both cases the three transducer arrangement provided significantly smaller error than either the single or double caliper devices.

As mentioned above, the three sensor arrangement described is particularly useful for detecting unusual movements of the drillstring 14 or of the BHA 26. FIGS. 12 through 14 illustrate the manner in which such unusual movements may be detected using the present apparatus. In all of these FIGS. 12 through 14, the standoff traces represent filtered measurements from each of the transducers 48. The eccentricity and angle traces were generated through computation using the equations indicated above. The caliper traces represent an average of twice the borehole radius computed using the equations described.

FIG. 12 illustrates logging traces that indicate sticking of the BHA 26 in the borehole 18. During normal drilling, the trace of the angle θ would be expected to rise and fall regularly between 0° and 60° due to the 120° displacement between the transducers 48. However, where the BHA is sticking, as shown in FIG. 12, the angle θ may tend to remain relatively constant over brief periods. Because the top of the drillstring 14 continues to rotate, the angle θ oscillates rapidly following each period of sticking, indicating that the BHA has broken free, and that twist in the drill string 14 has been relieved.

FIG. 13 illustrates the case where the BHA 26 is rotating while moving laterally in the borehole 18. The erratic bahavior of the angle θ indicates a much higher frequency than that at the surface. Also, the eccentricity trace indicates that the center of the drillpipe 24 is oscillating across the center of the borehole 18 several times per second. Such lateral movement causes the angular frequency to be greater than the rotational frequency because the angle θ is referenced to the eccentricity. This motion can correspond to large shocks to the BHA 26, potentially resulting in damage.

FIG. 14 illustrates the case where the BHA 26 is whirling. The angular motion is uniform, but is three times as fast as the rotation at the surface, evidenced by the regular pattern in the standoff traces. In such cases, the eccentricity trace indicates constant eccentering and no lateral motion. Because the angular motion is referenced to the eccentering vector E, the center of the BHA 26 must be revolving around the center of the borehole 18, but in a rotational direction opposite that of the BHA 26. Such motion is commonly known as whirling, and can be very damaging to certain types of drill bits.

To detect and monitor movements of the BHA 26 in the borehole 18, the following method is preferred. The transducers 48 are preferably pulsed every 10 milliseconds. The data collected from the transducers 48 is processed through a spike filter, and the angle θ and eccentricity are computed as described above. The angle θ is monitored over a selected time interval, typically 60 seconds, to determine when it rises above some upper threshold, such as 50°. When the threshold is crossed, a peak is considered to be found, and the time at which the peak occurs is recorded. The angle is continuously monitored for additional peaks, but subsequent peaks are not considered to occur until the angle has dropped below a lower threshold, such as 10°. In this way, the time between successive peaks is obtained. In the preferred method, the time between every third peak is the value used in the calculations. This provides more accurate data with less jitter. The time thus obtained is inverted to provide a rotational frequency value, designated $f_{rot}$. Also, the percent standard deviation of this rotational frequency, $\sigma_{rot}$ is determined over each time interval.

In a similar way, the eccentricity trace is evaluated to determine a quantity representative of the frequency with which the BHA 26 is banging laterally in the borehole 18, designated $f_{banging}$. When the eccentricity rises above a certain upper threshold, such as 0.5 inches, a peak is considered to be found. The trace is continuously monitored for subsequent peaks, but a peak will not be considered to occur until the eccentricity drops below a lower threshold, such as 0.2 inches. The banging frequency is then taken as the inverse of the average time between such peaks.

The values for the variables $f_{rot}$, $\sigma_{rot}$, and $f_{banging}$ can be used to interpret the BHA motion. These values can either be sent to control unit 37 on the earth's surface for the driller or logging engineer to interpret, or they can be analyzed downhole to provide a simple, interpreted result that can be routed to the driller. Interpretation of these values can be made with a table similar to Table 1 below.

TABLE 1

| $f_{rot}$ (rpm) | $\delta_{rot}$ (%) | $f_{banging}$ (rpm) | BHA Motion |
| --- | --- | --- | --- |
| <90 | <10 | <90 | Normal |
| — | — | ≧90 | Banging |
| <90 | >10 | <90 | Sticking. (The greater $\delta_{rot}$, the worse the sticking.) |
| >90 | — | <90 | Whirling. (The larger $f_{rot}$ the worse the whirling.) |

We claim:

1. An apparatus for determining dimensions of a borehole during a drilling operation, comprising:

a drill bit;

a logging tool coupled to said drill bit;

at least three distance determining sensors circumferentially spaced relative to said logging tool, each of said sensors adapted for generating an output signal in response to an input pulse and generating an output pulse in response to an input signal; and control circuitry in communication with said sensors, said control circuitry comprising:

signal conditioning circuitry receiving said output pulse, and amplifying and filtering said output pulse to generate a filtered signal;

a threshold generator generating a threshold signal whose magnitude decays exponentially with elapsed time; and a comparator receiving said threshold signal and said filtered signal, comparing the magnitude of said threshold signal with a magnitude of said filtered signal, and generating a time-of-flight signal representative of an elapsed time between transmission of said output signal and receipt of said input signal by one of said sensors in response to filtered signals having a magnitude greater than the magnitude of said threshold signal.

2. The apparatus of claim 1, wherein each of said sensors comprise an acoustic transducer.

3. The apparatus of claim 2, wherein said acoustic transducers are equally spaced around said logging tool.

4. The apparatus of claim 3, wherein said acoustic transducers are at least partially housed within said logging tool.

5. The apparatus of claim 4, wherein said acoustic transducers comprise:

a crystal adapted for generating ultrasonic signals; and a backing element providing sound absorption.

6. The apparatus of claim 5, wherein the acoustic impedance of said backing element matches the acoustic impedance of said crystal.

7. The apparatus of claim 1, wherein said control circuitry further comprises a programmed central processing unit for processing said time-of-flight signals to generate dimensional signals.

8. The apparatus of claim 7, wherein said programmed central processing unit processes said time-of-flight signals to generate:

an eccentricity signal E representative of an eccentricity vector of said logging tool as a function of an intermediate variable signal α and a radius signal R representative of an effective radius of said borehole in accordance with the following relationship:

$$E = \sqrt{R^2 - \alpha} \ .$$

9. The apparatus of claim 8, wherein said programmed central processing unit processes said time-of-flight signals to generate:

an angle of eccentricity signal θ representative of an angle between said eccentricity vector and a vector passing through a center of said logging tool and a sensor having a time-of-flight signal with a smallest magnitude of said time-of-flight signals as a function of said radius signal R, said eccentricity signal E, and a smallest radii signal $r_1$ representative of a smallest radial distance along a vector directed from a center of said logging tool through a centerline of a sensor to an opposing wall of said borehole in accordance with the following relationship:

$$\Theta = \cos^{-1}\left( \frac{R^2 - E^2 - r_1^2}{2 r_1 E} \right).$$

10. The apparatus of claim 9, further comprising a surface control unit; wherein said dimensional signals are communicated to said surface control unit.

11. The apparatus of claim 1, wherein said control circuitry further comprises a programmed central processing unit for processing said time-of-flight signals to generate a motion signal representative of a motion of said logging tool.

12. The apparatus of claim 11, wherein said programmed central processing unit processes said time-of-flight signals to generate said motion signal as a function of a banging frequency signal representative of a frequency with which said logging tool is banging laterally in said borehole, a rotational frequency signal representative of a rate of change of an angle of eccentricity, and a percent standard deviation signal representative of a percent standard deviation of a rate of change of said angle of eccentricity in accordance with the following relationships:

said motion signal indicates normal motion by said drilling assembly when said rotational frequency signal indicates less than 90 revolutions per minute, said percent standard deviation signal indicates less than 10 percent, and said banging frequency signal indicates less than 90 revolutions per minute;

said motion signal indicates banging motion by said drilling assembly when said banging frequency signal indicates at least 90 revolutions per minute;

said motion signal indicates sticking motion by said drilling assembly when said rotational frequency signal indicates less than 90 revolutions per minute, said percent standard deviation signal indicates greater than 10 percent, and said banging frequency signal indicates less than 90 revolutions per minute; and said motion signal indicates whirling motion by said drilling assembly when said rotational frequency signal indicates greater than 90 revolutions per minute and said banging frequency signal indicates less than 90 revolutions per minute.

13. The apparatus of claim 12, further comprising a surface control unit wherein said motion signal is communicated to said surface control unit.

14. The apparatus of claim 1, wherein said control circuitry further comprises a central processing unit generating a first tinting signal, a second timing signal, a third timing signal, and sensor selection signals.

15. The apparatus of claim 14, wherein said control circuitry further comprises a decoder receiving said sensor selection signals and said first timing signal and generating said input pulse for transmission to a selected one of said sensors.

16. The apparatus of claim 14, wherein said threshold generator receives said second timing signal and generates said threshold signal whose magnitude decays exponentially with elapsed time.

17. The apparatus of claim 14, wherein said comparator receives said third timing signal, said threshold signal, and said filtered signal, compares the magnitude of said threshold signal with the magnitude of said filtered signal and generates a registered signal in response to filtered signals having a magnitude greater than the magnitude of said threshold signal, and compares said registered signal with said third timing signal to generate said time-of-flight signal.

18. A method for determining dimensions of a borehole during a drilling operation, comprising the steps of:

(a) providing a drilling assembly having at least three distance determining sensors circumferentially spaced around the exterior of said assembly;

(b) actuating said sensors for a selected time period during said drilling operation to provide at least one output pulse from each of said sensors;

(c) amplifying and filtering said output pulses to generate filtered signals;

(d) generating a threshold signal whose magnitude decays exponentially with elapsed time;

(e) comparing the magnitude of said threshold signal with a magnitude of said filtered signals;

(f) generating at least one time-of-flight signal for each of said sensors representative of an elapsed time between transmission of said output signal and receipt of said input signal by said sensor in response to filtered signals having a magnitude greater than the magnitude of said threshold signal; and (g) processing said time-of-flight signals to generate dimensional signals.

19. The method of claim 18, wherein step (g) comprises the steps of:

generating an eccentricity signal representative of an eccentricity vector of said drilling assembly; and generating an angle of eccentricity signal representative of an angle between said eccentricity vector and a vector passing through the center of said drilling assembly and a sensor having a time-of-flight signal with the smallest magnitude of said time-of-flight signals.

20. The method of claim 19, wherein step (g) further comprises the steps of:

generating a standoff signal for each of said sensors, said standoff signal representative of a radial distance between a face of said sensor and an opposing wall of said borehole; and generating a caliper signal representative of two times an effective radius of said borehole.

21. The method of claim 20, further comprising the step of:

communicating said dimensional signals to a surface control unit.

22. The method of claim 18, further comprising the step of:

(h) processing said time-of-flight signals to generate a motion signal representative of a motion of said drilling assembly.

23. The method of claim 22, wherein said motion signal indicates whether the drilling assembly is experiencing one of:

normal motion;

banging motion;

sticking motion; or whirling motion.

24. The method of claim 22, wherein said step (h) comprises the steps of:

processing said time-of-flight signals to generate:

an eccentricity signal representative of an eccentricity vector of said drilling assembly; and an angle of eccentricity signal representative of an angle between said eccentricity vector and a vector passing through the center of said drilling assembly and a sensor having a time-of-flight signal with the smallest magnitude of said time-of-flight signals;

processing said eccentricity signal to generate a banging frequency signal representative of a frequency with which said drilling assembly is banging laterally in said borehole;

processing said angle of eccentricity signal to generate a rotational frequency signal representative of a rate of change of said angle of eccentricity; and processing said rotational frequency signal to generate a percent standard deviation signal representative of a percent standard deviation of said rate of change of said angle of eccentricity.

25. The method of claim 24, wherein step (h) further comprises the step of:

processing said banging frequency signal, said rotational frequency signal, and said percent standard deviation signal to generate said motion signal.

26. The method of claim 25, wherein said motion signal indicates normal motion by said drilling assembly when said rotational frequency signal indicates less than 90 revolutions per minute, said percent standard deviation signal indicates less than 10 percent, and said banging frequency signal indicates less than 90 revolutions per minute.

27. The method of claim 25, wherein said motion signal indicates banging motion by said drilling assembly when said banging frequency signal indicates at least 90 revolutions per minute.

28. The method of claim 25, wherein said motion signal indicates sticking motion by said drilling assembly when said rotational frequency signal indicates less than 90 revolutions per minute, said percent standard deviation signal indicates greater than 10 percent, and said banging frequency signal indicates less than 90 revolutions per minute.

29. The method of claim 25, wherein said motion signal indicates whirling motion by said drilling assembly when said rotational frequency signal indicates greater than 90 revolutions per minute and said banging frequency signal indicates less than 90 revolutions per minute.

30. The method of claim 22, further comprising the step of:
communicating said motion signal to a surface control unit.

31. The method of claim 18, wherein step (b) comprises the steps of:
generating a first timing signal and sensor selection signals;
selecting one of said sensors for generation of an output signal as a function of said sensor selection signals and said first timing signal; and
receiving an input signal and generating said output pulse.

32. The method of claim 18, wherein step (d) comprises the step of:
receiving a second timing signal and generating said threshold signal whose magnitude decays exponentially with elapsed time.

33. The method of claim 18, wherein step (f) comprises the steps of:
receiving a third timing signal, said threshold signal, and said filtered signal;
comparing the magnitude of said threshold signal with the magnitude of said filtered signals and generating a registered signal in response to filtered signals having a magnitude greater than the magnitude of said threshold signal; and
comparing said registered signal with said third timing signal and generating said time-of-flight signal.

34. The method of claim 18, wherein step (g) comprises the step of:
processing said time-of-flight signals to generate at least one standoff signal for each of said sensors representative of a radial distance from a face of a sensor to an opposing wall of said borehole;
wherein a magnitude of said standoff signal is directly proportional to a magnitude of said time-of-flight signal for said sensor.

35. The method of claim 34, wherein step (g) further comprises the step of:
processing said standoff signals to generate at least one radii signal for each sensor representative of a radial distance along a vector directed from a center of said drilling assembly through a centerline of said sensor to said opposing wall of said borehole;
wherein a magnitude of said radii signal is directly proportional to the magnitude of said standoff signal of said sensor.

36. The method of claim 35, wherein step (g) further comprises the step of:
processing said radii signals to generate an intermediate variable signal;
wherein a magnitude $\alpha$ of said intermediate variable signal is directly proportional to each of the following:
the summation of the magnitudes of said radii signals; and
the product of the magnitudes of said radii signals; and
wherein the magnitude $\alpha$ of said intermediate variable signal is inversely proportional to the summation of the permutations of the magnitudes of said radii signals.

37. The method of claim 26, wherein step (g) further comprises the step of:
processing said radii signals and said intermediate variable signal to generate a radius signal representative of an effective radius of said borehole;
wherein a magnitude R of said radius signal is functionally related to the magnitude of said radii signals and the magnitude $\alpha$ of said intermediate variable signal.

38. The method of claim 37 wherein step (g) further comprises the step of:
processing said radius signal and said intermediate variable signal to generate an eccentricity signal representative of an eccentricity vector of said drilling assembly;
wherein a magnitude E of said eccentricity signal is related to the magnitude R of said radius signal and the magnitude $\alpha$ of said intermediate variable signal by the following relationship:

$$E = \sqrt{R^2 - \alpha}\ .$$

39. The method of claim 38, wherein step (g) further comprises the step of:
processing said radius signal, said eccentricity signal, an a radii signal having a smallest magnitude of said radii signals to generate an angle of eccentricity signal representative of an angle between said eccentricity vector and a vector passing through a center of said drilling assembly and a sensor having a time-of-flight signal with a smallest magnitude of said time-of-flight signals;
wherein a magnitude $\theta$ of said angle of eccentricity signal is related to the magnitude R of said radius signal, the magnitude E of said eccentricity signal, and the magnitude $r_1$ of said radii signal having the smallest magnitude of said radii signals by the following relationship:

$$\Theta = \cos^{-1}\left( \frac{R^2 - E^2 - r_1^2}{2 r_1 E} \right).$$

40. An apparatus for determining dimensions of a borehole during a drilling operation, comprising:
a drill bit;
a logging tool coupled to said drill bit;

at least three distance determining sensors circumferentially spaced relative to said logging tool, each of said sensors adapted for generating an output signal in response to an input pulse and generating an output pulse in response to an input signal; and control circuitry in communication with said sensors, said control circuitry comprising:

signal conditioning circuitry receiving said output pulse, and amplifying and filtering said output pulse to generate a filtered signal;

a threshold generator generating a threshold signal whose magnitude decays exponentially with elapsed time;

a comparator receiving said threshold signal and said filtered signal, comparing the magnitude of said threshold signal with a magnitude of said filtered signal, and generating a time-of-flight signal representative of an elapsed time between transmission of said output signal and receipt of said input signal by one of said sensors in response to filtered signals having a magnitude greater than the magnitude of said threshold signal; and a programmed central processing unit for processing said time-of-flight signals to generate:

an eccentricity signal E representative of an eccentricity vector of said logging tool as a function of an intermediate variable signal $\alpha$ and a radius signal R representative of an effective radius of said borehole in accordance with the following relationship:

$$E = \sqrt{R^2 - \alpha} \quad ;$$

an angle of eccentricity signal $\theta$ representative of an angle between said eccentricity vector and a vector passing through a center of said logging tool and a sensor having a time-of-flight signal with a smallest magnitude of said time-of-flight signals as a function of said radius signal R, said eccentricity signal E, and a smallest radii signal $r_1$ representative of a smallest radial distance along a vector directed from a center of said logging tool through a centerline of a sensor to an opposing wall of said borehole in accordance with the following relationship:

$$\theta = \cos^{-1}\left( \frac{R^2 - E^2 - r_1^2}{2r_1 E} \right) ; \text{ and}$$

a motion signal representative of a motion of said logging tool as a function of a banging frequency signal representative of a frequency with which said logging tool is banging laterally in said borehole, a rotational frequency signal representative of a rate of change of an angle of eccentricity, and a percent standard deviation signal representative of a percent standard deviation of a rate of change of said angle of eccentricity in accordance with the following relationships:

said motion signal indicates normal motion by said drilling assembly when said rotational frequency signal indicates less than 90 revolutions per minute, said percent standard deviation signal indicates less than 10 percent, and said banging frequency signal indicates less than 90 revolutions per minute;

said motion signal indicates banging motion by said drilling assembly when said banging frequency signal indicates at least 90 revolutions per minute;

said motion signal indicates sticking motion by said drilling assembly when said rotational frequency signal indicates less than 90 revolutions per minute, said percent standard deviation signal indicates greater than 10 percent, and said banging frequency signal indicates less than 90 revolutions per minute; and said motion signal indicates whirling motion by said drilling assembly when said rotational frequency signal indicates greater than 90 revolutions per minute and said banging frequency signal indicates less than 90 revolutions per minute.

41. An apparatus for determining dimensions of a borehole during a drilling operation, comprising:

a drill bit;

a logging tool coupled to said drill bit;

at least three distance determining sensors circumferentially spaced relative to said logging tool, each of said sensors adapted for generating an output signal in response to an input pulse and generating an output pulse in response to an input signal; and control circuitry in communication with said sensors, said control circuitry comprising:

a central processing unit generating a first timing signal, a second timing signal, a third timing signal, and sensor selection signals;

a decoder receiving said sensor selection signals and said first timing signal and generating an input pulse for transmission to a selected one of said sensors;

signal conditioning circuitry receiving said output pulse and amplifying and filtering said output pulse to generate a filtered signal;

a threshold generator receiving said second timing signal and generating a threshold signal whose magnitude decays exponentially with elapsed time; and a comparator receiving said third timing signal, said threshold signal, and said filtered signal, comparing the magnitude of said threshold signal with a magnitude of said filtered signal and generating a registered signal in response to filtered signals having a magnitude greater than the magnitude of said threshold signal, and comparing said registered signal with said third timing signal to generate a time-of-flight signal representative of an elapsed time between transmission of said output signal and receipt of said input signal by one of said sensors; and a surface control unit in communication with said control circuitry.

42. A method for determining dimensions of a borehole during a drilling operation, comprising the steps of:

(a) providing a drilling assembly having at least three distance determining sensors circumferentially spaced around the exterior of said assembly;

(b) actuating said sensors for a selected time period during said drilling operation to provide at least one output pulse from each of said sensors;

(c) amplifying and filtering said output pulses to generate filtered signals;

(d) generating a threshold signal whose magnitude decays exponentially with elapsed time;

(e) comparing the magnitude of said threshold signal with a magnitude of said filtered signals;

(f) generating at least one time-of-flight signal for each of said sensors representative of an elapsed time between transmission of said output signal and receipt of said input signal by said sensor in response to filtered signals having a magnitude greater than the magnitude of said threshold signal;

(g) processing said time-of-flight signals to generate at least one standoff signal for each of said sensors, said standoff signal representative of a radial distance from a face of a sensor to an opposing wall of said borehole; wherein a magnitude of said standoff signal is directly proportional to a magnitude of said time-of-flight signal for said sensor;

(h) processing said standoff signals to generate at least one radii signal for each of said sensors, said radii signal representative of a radial distance along a vector directed from a center of said drilling assembly through a centerline of a sensor to said opposing wall of said borehole; wherein a magnitude of said radii signal is directly proportional to the magnitude of said standoff signal of said sensor;

(i) processing said radii signals to generate an intermediate variable signal; wherein a magnitude $\alpha$ of said intermediate variable signal is directly proportional to each of the following:
the summation of the magnitudes of said radii signals; and
the product of the magnitudes of said radii signals; and wherein the magnitude $\alpha$ of said intermediate variable signal is inversely proportional to the summation of the permutations of the magnitudes of said radii signals;

(j) processing said radii signals and said intermediate variable signal to generate a radius signal representative of an effective radius of said borehole; wherein a magnitude R of said radius signal is functionally related to the magnitude of said radii signals and the magnitude $\alpha$ of said intermediate variable signal;

(k) processing said radius signal and said intermediate variable signal to generate an eccentricity signal representative of an eccentricity vector of said drilling assembly; wherein a magnitude E of said eccentricity signal is related to the magnitude R of said radius signal and the magnitude $\alpha$ of said intermediate variable signal by the following relationship:

$$E = \sqrt{R^2 - \alpha} \ ;$$

(l) processing said radius signal, said eccentricity signal, and a radii signal having a smallest magnitude of said radii signals to generate an angle of eccentricity signal representative of an angle between said eccentricity vector and a vector passing through a center of said drilling assembly and a sensor having a time-of-flight signal with a smallest magnitude of said time-of-flight signals; wherein a magnitude $\theta$ of said angle of eccentricity signal is related to the magnitude R of said radius signal, the magnitude E of said eccentricity signal, and the magnitude $r_1$ of said radii signal having the smallest magnitude by the following relationship:

$$\Theta = \cos^{-1}\left(\frac{R^2 - E^2 - r_1^2}{2r_1 E}\right) ; \text{ and}$$

(m) processing said eccentricity signal to generate a banging frequency signal representative of a frequency with which said drilling assembly is banging laterally in said borehole;

(n) processing said angle of eccentricity signal to generate a rotational frequency signal representative of a rate of change of said angle of eccentricity;

(o) processing said rotational frequency signal to generate a percent standard deviation signal representative of the percent standard deviation of said rate of change of said angle of eccentricity;

(p) processing said frequency of banging signal, said rotational frequency signal, and said percent standard deviation signal to generate a motion signal representative of a motion of said drilling assembly within said borehole;
wherein said motion signal indicates normal motion by said drilling assembly when said rotational frequency signal indicates less than 90 revolutions per minute, said percent standard deviation signal indicates less than 10 percent, and said banging frequency signal indicates less than 90 revolutions per minute;
wherein said motion signal indicates banging motion by said drilling assembly when said banging frequency signal indicates at least 90 revolutions per minute;
wherein said motion signal indicates sticking motion by said drilling assembly when said rotational frequency signal indicates less than 90 revolutions per minute, said percent standard deviation signal indicates greater than 10 percent, and said banging frequency signal indicates less than 90 revolutions per minute;
wherein said motion signal indicates whirling motion by said drilling assembly when said rotational frequency signal indicates greater than 90 revolutions per minute, and said banging frequency signal indicates less than 90 revolutions per minute; and (q) communicating said dimensional signals and said motion signal to a surface control unit.

43. A method for determining dimensions of a borehole during a drilling operation, comprising the steps of:

(a) providing a drilling assembly having at least three distance determining sensors circumferentially spaced around the exterior of said assembly;

(b) generating a first timing signal and sensor selection signals;

(c) selecting one of said sensors for generation of an output signal as a function of said sensor selection signals and said first timing signal;

(d) receiving an input signal and generating an output pulse;

(e) amplifying and filtering said output pulse to generate a filtered signal;

(f) receiving a second timing signal and generating a threshold signal whose magnitude decays exponentially with elapsed time;

(g) receiving a third timing signal, said threshold signal, and said filtered signal;

(h) comparing the magnitude of said threshold signal with a magnitude of said filtered signal and generating a registered signal in response to filtered signals having a magnitude greater than the magnitude of said threshold signal;

(i) comparing said registered signal with said third timing signal and generating a time-of-flight signal representative of an elapsed time between transmission of said output signal and receipt of said input signal by said sensor;

(j) generating at least one time-of-flight signal for each of said sensors;

(k) processing said time-of-flight signals to generate dimensional signals.

* * * * *